US010509953B2

(12) United States Patent
Natori et al.

(10) Patent No.: US 10,509,953 B2
(45) Date of Patent: Dec. 17, 2019

(54) CARRY MEASURING DEVICE, HIT-BALL-DIRECTION MEASURING DEVICE, CARRY MEASURING SYSTEM, CARRY MEASURING METHOD, HIT-BALL DETERMINING DEVICE, HIT-BALL DETERMINING SYSTEM, HIT-BALL DETERMINING METHOD, AND RECORDING MEDIUM

(71) Applicant: SEIKO EPSON CORPORATION, Tokyo (JP)

(72) Inventors: Yoichi Natori, Matsumoto (JP); Shoichi Nakajo, Matsumoto (JP); Hisao Tanaka, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 1019 days.

(21) Appl. No.: 14/965,392

(22) Filed: Dec. 10, 2015

(65) Prior Publication Data

US 2016/0175651 A1 Jun. 23, 2016

(30) Foreign Application Priority Data

Dec. 19, 2014 (JP) ................................ 2014-257252
Dec. 19, 2014 (JP) ................................ 2014-257254

(51) Int. Cl.
*A63B 24/00* (2006.01)
*G06K 9/00* (2006.01)

(52) U.S. Cl.
CPC .............................. *G06K 9/00342* (2013.01)

(58) Field of Classification Search
CPC ............ G06K 9/00342; A63B 24/0021; A63B 2024/0031; A63B 24/00

USPC ............................................................. 463/7
See application file for complete search history.

(56) References Cited

U.S. PATENT DOCUMENTS

| 8,905,855 B2 * | 12/2014 | Fitzpatrick .............. G06T 13/40 473/199 |
| 9,393,478 B2 | 7/2016 | Niegowski |
| 9,427,639 B2 | 8/2016 | Rauchholz et al. |
| 9,486,669 B2 | 11/2016 | Niegowski et al. |
| 9,943,744 B2 * | 4/2018 | Meadows ............... G01S 19/19 |
| 2006/0025229 A1 * | 2/2006 | Mahajan ............ A63B 24/0003 473/131 |

(Continued)

FOREIGN PATENT DOCUMENTS

| JP | H05-19035 A | 1/1993 |
| JP | H06-15022 A | 1/1994 |

(Continued)

*Primary Examiner* — David L Lewis
*Assistant Examiner* — Matthew D Hoel
(74) *Attorney, Agent, or Firm* — Oliff PLC

(57) ABSTRACT

A carry measuring device includes a first acquiring section configured to acquire a sensor signal from a motion sensor attached to at least one of an exercise instrument and a user, a second acquiring section configured to acquire position information, a shot detecting section configured to detect a shot on the basis of the sensor signal, a position measuring section configured to measure a shot position on the basis of the position information at the time when the shot is detected, and a carry measuring section configured to measure a carry of a hit ball on the basis of the distance between the shot position of the last time and the shot position of this time.

22 Claims, 18 Drawing Sheets

(56) References Cited

U.S. PATENT DOCUMENTS

2009/0209358 A1    8/2009   Niegowski
2011/0230985 A1    9/2011   Niegowski et al.
2014/0141902 A1    5/2014   Rauchholz et al.
2015/0358770 A1   12/2015   Somiya et al.

FOREIGN PATENT DOCUMENTS

| | | |
|---|---|---|
| JP | H10-43349 A | 2/1998 |
| JP | 2000-225226 A | 8/2000 |
| JP | 2007-014487 A | 1/2007 |
| JP | 2007-033243 A | 2/2007 |
| JP | 2011-183067 A | 9/2011 |
| JP | 2012-090749 A | 5/2012 |
| JP | 2012-170662 A | 9/2012 |
| JP | 2013-012032 A | 1/2013 |
| JP | 2014-512219 A | 5/2014 |
| WO | 2006/082615 A1 | 8/2006 |
| WO | 2013/190722 A1 | 12/2013 |

* cited by examiner

SHOT INFORMATION 140

| HOLE NUMBER | SHOT NUMBER | STOP POSITION | CARRY | HIT BALL DIRECTION |
|---|---|---|---|---|
| 1 | 0 | (**, **) | — | — |
| | 1 | (**, **) | *** | *** |
| | 2 | (**, **) | *** | *** |
| | 3 | (**, **) | *** | *** |
| | 4 | (**, **) | *** | *** |
| ⋮ | ⋮ | ⋮ | ⋮ | ⋮ |

141, 142, 143, 144, 145

SHOT INFORMATION 140

| HOLE NUMBER (141) | SHOT NUMBER (142) | STOP POSITION (143) | HIT BALL AREA (146) |
|---|---|---|---|
| 1 | 0 | (**, **) | TEE-IN GROUND |
| | 1 | (**, **) | FAIRWAY |
| | 2 | (**, **) | FAIRWAY |
| | 3 | (**, **) | GREEN |
| | 4 | (**, **) | CUP |
| ⋮ | ⋮ | ⋮ | ⋮ |

FIG. 13

SHOT INFORMATION 140

| HOLE NUMBER (141) | SHOT NUMBER (142) | STOP POSITION (143) | HIT BALL AREA (146) | CARRY (144) | SHOT EVALUATION (147) |
|---|---|---|---|---|---|
| 1 | 0 | (**, **) | TEE-IN GROUND | – | – |
| | 1 | (**, **) | FAIRWAY | *** | GOOD |
| | 2 | (**, **) | BUNKER | *** | BAD |
| | 3 | (**, **) | GREEN | *** | – |
| | 4 | (**, **) | CUP | *** | – |
| ⋮ | ⋮ | ⋮ | ⋮ | ⋮ | ⋮ |

FIG. 17

CARRY MEASURING DEVICE, HIT-BALL-DIRECTION MEASURING DEVICE, CARRY MEASURING SYSTEM, CARRY MEASURING METHOD, HIT-BALL DETERMINING DEVICE, HIT-BALL DETERMINING SYSTEM, HIT-BALL DETERMINING METHOD, AND RECORDING MEDIUM

BACKGROUND

1. Technical Field

The present invention relates to a carry measuring device, a hit-ball-direction measuring method, a carry measuring system, a carry measuring method, a hit-ball determining device, a hit-ball determining system, a hit-ball determining method, and a recording medium.

2. Related Art

JP-A-10-43349 (Patent Literature 1) describes a swing diagnosis device that determines a hit ball direction and a carry of a hit ball on the basis of acceleration at impact time of a swing (a shot) obtained from an acceleration sensor attached to the back of the hand of a human.

However, in Patent Literature 1, a hit ball direction and a hit ball carry are estimated by integrating the acceleration at the impact time of the swing. Estimated values of the hit ball direction and the hit ball carry often deviate from an actual hit ball direction and an actual hit ball carry. As a cause of the deviation, for example, accumulation of calculation errors due to the integration and the influence of weather conditions such as wind on a hit ball are conceivable.

SUMMARY

An advantage of some aspects of the invention is to obtain a more accurate hit ball carry or a more accurate hit ball direction.

In order to improve golf play, a golf player desires to learn, for example, an index (a fairway keep ratio) representing in how many tee shots among all tee shots hit balls were successfully put on a fairway. To calculate the fairway keep ratio, for example, the player needs to take notes every time the player performs a tee shot and totalize the notes afterwards. To calculate not only the fairway keep ratio but also indexes requiring determination concerning in which area (e.g., a fairway, a rough, or a bunker) in a hole a hit ball is located, that is, determination of the position of the hit ball, the player needs to take notes every time the player performs a tee shot. This is extremely troublesome and sometimes causes an error.

In the technique of Patent Literature 1, the position of a hit ball on a golf course cannot be determined. Further, indexes such as the fairway keep ratio based on the position of the hit ball cannot be calculated.

Another advantage of some aspects of the invention is to easily and accurately determine the position of a hit ball without work of a player.

An aspect of the invention is directed to a carry measuring device including: a first acquiring section configured to acquire a sensor signal from a motion sensor attached to at least one of an exercise instrument and a user; a second acquiring section configured to acquire position information; a shot detecting section configured to detect a shot on the basis of the sensor signal; a position measuring section configured to measure a shot position on the basis of the position information at the time when the shot is detected; and a carry measuring section configured to measure a carry of a hit ball on the basis of the distance between the shot position of the last time and the shot position of this time. Consequently, it is possible to easily and accurately measure the carry of the hit ball without work of a player.

In the carry measuring device, the position measuring section may measure, when N is an integer equal to or larger than 2, the shot position of an N-th shot as a stop position of a ball hit by an N−1-th shot, and the carry measuring section may measure, as the carry of the N−1-th shot, the distance between the stop position of the ball of an N−2-th shot (in the case of N=2, the shot position of a first shot) and the stop position of the ball of the N−1-th shot. Consequently, it is possible to sequentially record the stop positions of the ball by the shots and carries of the ball.

In the carry measuring device, the shot detecting section may detect a shot when an impact on a ball is detected. Consequently, it is possible to more accurately detect a shot position.

In the carry measuring device, the shot detecting section may detect an end of a hole on the basis of the sensor signal or on the basis of a predetermined operation input, the position measuring section may measure, as the stop position of the ball of a last shot in the hole, the position information at the time when the end of the hole is detected, and the carry measuring section may measure a carry of the last shot on the basis of the stop position of the ball of a shot immediately preceding the last shot in the hole and the stop position of the ball of the last shot. Consequently, it is possible to determine the stop position of the ball of the last shot in the hole. Therefore, it is possible to measure stop positions and carries of the ball of all shots in holes.

In the carry measuring device, the position measuring section may measure distances from the stop positions of the ball of the shots to a predetermined target position. Consequently, it is possible to easily present an accurate residual distance from the stop position of the ball to the target position as information useful for improvement of golf play of the player.

In the carry measuring device, the position measuring section may measure altitude together with the shot position, and the carry measuring section may measure the carry of the shot on the basis of the shot position and the altitude. Consequently, for example, even when there is a slope in a golf course, it is possible to calculate a more accurate carry.

In the carry measuring device, the second acquiring section may acquire position information from a GPS receiving section carried by the user. Consequently, if the GPS receiving section is attached to the user, it is possible to easily acquire the position information.

Another aspect of the invention is directed to a hit-ball-direction measuring device including: a first acquiring section configured to acquire a first sensor signal from a motion sensor attached to at least one of an exercise instrument and a user; a second acquiring section configured to acquire position information; a shot detecting section configured to detect a shot on the basis of the first sensor signal; a position measuring section configured to measure a shot position on the basis of the position information at the time when the shot is detected; and a hit-ball-direction measuring section configured to measure a hit ball direction on the basis of the shot position of the last time and the shot position of this time. Consequently, it is possible to easily and accurately calculate the hit ball direction.

In the hit-ball-direction measuring device, the second acquiring section may acquire a second sensor signal from an orientation sensor attached to at least one of the exercise instrument and the user, and the hit-ball-direction measuring section may measure a target direction of the shot on the basis of the second sensor signal and calculate a difference between the target direction and the hit ball direction. Consequently, it is possible to present the hit ball direction with respect to the target direction as information useful for improvement of golf play of a player.

Still another aspect of the invention is directed to a carry measuring system including: a motion sensor attached to at least one of an exercise instrument and a user; a GPS receiving section; a first acquiring section configured to acquire a sensor signal from the motion sensor; a second acquiring section configured to acquire position information from the GPS receiving section; a shot detecting section configured to detect a shot on the basis of the sensor signal; a position measuring section configured to measure a shot position on the basis of the position information at the time when the shot is detected; and a carry measuring section configured to measure a carry of a hit ball on the basis of the distance between the shot position of the last time and the shot position of this time. Consequently, it is possible to easily and accurately measure the carry of the hit ball without work of a player.

Yet another aspect of the invention is directed to a carry measuring method including: acquiring a sensor signal from a motion sensor attached to at least one of an exercise instrument and a user; acquiring position information; detecting a shot on the basis of the sensor signal; measuring a shot position on the basis of the position information at the time when the shot is detected; and measuring a carry of a hit ball on the basis of the distance between the shot position of the last time and the shot position of this time. Consequently, it is possible to easily and accurately measure the carry of the hit ball without work of a player.

Still yet another aspect of the invention is directed to a recording medium having recorded therein a computer program for causing a computer to execute: acquiring a sensor signal from a motion sensor attached to at least one of an exercise instrument and a user; acquiring position information; detecting a shot on the basis of the sensor signal; measuring a shot position on the basis of the position information at the time when the shot is detected; and measuring a carry of a hit ball on the basis of the distance between the shot position of the last time and the shot position of this time. Consequently, it is possible to easily and accurately measure the carry of the hit ball without work of a player.

Further another aspect of the invention is directed to a hit-ball determining device including: a first acquiring section configured to acquire a sensor signal from a motion sensor attached to at least one of an exercise instrument and a user; a second acquiring section configured to acquire position information; a third acquiring section configured to acquire map information including a plurality of areas; a shot detecting section configured to detect a shot on the basis of the sensor signal; a position measuring section configured to measure a shot position on the basis of the position information at the time when the shot is detected; and an area determining section configured to determine in which of the plurality of areas the shot position is included. Consequently, it is possible to easily and accurately determine a stop position of a ball and an area of the stop position of the ball without work of a player.

In the hit-ball determining device, the position measuring section may measure, when N is an integer equal to or larger than 2, the shot position of an N-th shot as a stop position of a ball hit by an N−1-th shot, and the area determining section may determine in which of the plurality of areas the stop position of the ball of the N-th shot is included. Consequently, it is possible to sequentially record the stop positions of the ball by the shots and areas of the stop positions.

In the hit-ball determining device, the shot detecting section may detect the shot when an impact on the ball is detected. Consequently, it is possible to more accurately detect the shot position.

In the hit-ball determining device, the area determining section may determine the stop positions of the ball of the shots for each of holes included in a golf course, and the hit-ball determining device may further include a totalizing section configured to calculate a fairway keep ratio on the basis of the number of holes in which the stop position of the ball of a first shot is included in a fairway. Consequently, it is possible to easily present an accurate fairway keep ratio as information useful for improvement of golf play of a player.

In the hit-ball determining device, the area determining section may determine the stop positions of the ball of the shots for each of holes included in a golf course, and the hit-ball determining device may further include a totalizing section configured to calculate a par-on ratio on the basis of the number of holes in which the stop positions of the ball of the shots corresponding to a specified number of shots of par-on are included in greens. Consequently, it is possible to easily present an accurate par-on ratio as information useful for improvement of golf play of a player.

The hit-ball determining device may further include a carry measuring section configured to measure carries of the shots on the basis of distances among the stop positions of the ball. Consequently, it is possible to easily and accurately calculate the carry.

The hit-ball determining device may further include a shot evaluating section configured to evaluate the shots on the basis of at least one of the carries and the areas in which the stop positions of the ball are included. Consequently, it is possible to easily and accurately evaluate the shot.

In the hit-ball determining device, when a carry of a shot exceeds a predetermined carry and the area in which the stop position of the ball of the shot is included is a fairway, the shot evaluating section may evaluate the shot as a nice shot. Consequently, it is possible to evaluate which shot is the nice shot and inform the user of the shot.

In the hit-ball determining device, when a carry of a shot is smaller than the predetermined carry, the shot evaluating section may evaluate the shot as a miss shot. Consequently, it is possible to evaluate which shot is the miss shot and inform the user of the shot.

In the hit-ball determining device, the second acquiring section may acquire position information from a GPS receiving section carried by the user. Consequently, if the GPS receiving section is attached to the user, it is possible to easily acquire the position information.

In the hit-ball determining device, the shot detecting section may detect an end of a hole on the basis of the sensor signal or on the basis of a predetermined operation input, and the position measuring section may measure, as the stop position of the ball of a last shot in the hole, the position information at the time when the end of the hole is detected, and the area determining section may determine in which of the plurality of areas the stop position of the ball of the last shot is included. Consequently, since it is possible to determine the stop position of the ball of the last shot in the hole, it is possible to record the stop positions of the ball of all the shots in the holes.

Still further another aspect of the invention is directed to a hit-ball determining system including: a motion sensor attached to at least one of an exercise instrument and a user; a GPS receiving section; a first acquiring section configured to acquire a sensor signal from the motion sensor; a second acquiring section configured to acquire position information from the GPS receiving section; a third acquiring section configured to acquire map information including a plurality of areas; a shot detecting section configured to detect a shot on the basis of the sensor signal; a position measuring section configured to measure a shot position on the basis of the position information at the time when the shot is detected; and an area determining section configured to determine in which of the plurality of areas the shot position is included. Consequently, it is possible to easily and accurately determine a stop position of a ball and an area of the stop position of the ball without work of a player.

Yet further another aspect of the invention is directed to a hit-ball determining method including: acquiring a sensor signal from a motion sensor attached to at least one of an exercise instrument and a user; acquiring position information; acquiring map information including a plurality of areas; detecting a shot on the basis of the sensor signal; measuring a shot position on the basis of the position information at the time when the shot is detected; and determining in which of the plurality of areas the shot position is included. Consequently, it is possible to easily and accurately determine a stop position of a ball and an area of the stop position of the ball without work of a player.

Still yet further another aspect of the invention is directed to a recording medium having recorded therein a computer program for causing a computer to execute: acquiring a sensor signal from a motion sensor attached to at least one of an exercise instrument and a user; acquiring position information; acquiring map information including a plurality of areas; detecting a shot on the basis of the sensor signal; measuring a shot position on the basis of the position information at the time when the shot is detected; and determining in which of the plurality of areas the shot position is included. Consequently, it is possible to easily and accurately determine a stop position of a ball and an area of the stop position of the ball without work of a player.

BRIEF DESCRIPTION OF THE DRAWINGS

The invention will be described with reference to the accompanying drawings, wherein like numbers reference like elements.

FIG. 13 is a diagram showing an example of a data structure of shot information.

FIG. 17 is a diagram showing an example of a data structure of shot information.

DESCRIPTION OF EXEMPLARY EMBODIMENTS

Embodiments of the invention are explained below with reference to the drawings. The embodiments are explained with reference to golf as an example. In the golf, a golf club is an example of an exercise instrument.

First Embodiment

Figure 1:
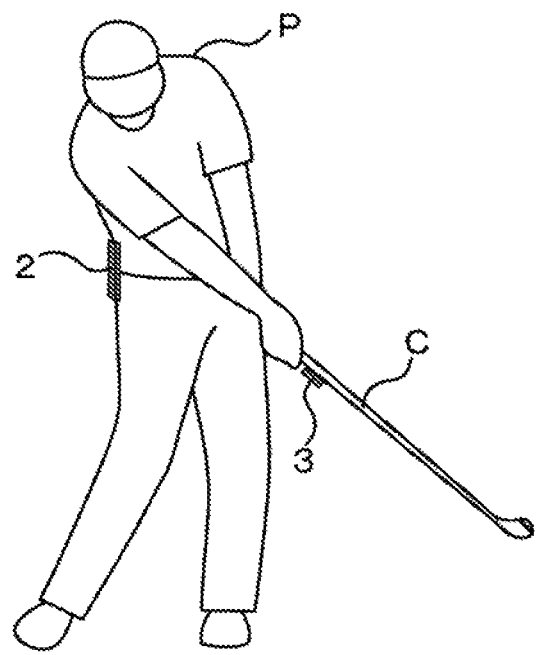
FIG. 1 is a diagram showing an example of the exterior of a carry measuring system according to a first embodiment of the invention.

FIG. 1 is a diagram showing an example of the exterior of a carry measuring system according to a first embodiment of the invention.

A carry measuring system 1 includes a carry measuring device 2 and a sensor device 3. The carry measuring device 2 and the sensor device 3 are communicably connected to each other by wire or radio. In the example shown in FIG. 1, the carry measuring device 2 is attached to the waist of a user P. The sensor device 3 is attached to a club C. Naturally, an attaching position of the carry measuring device 2 is not particularly limited and may be, for example, the back or the leg of the user P, the club C, or the like. An attaching position of the sensor device 3 is not particularly limited and may be, for example, the back of the hand or the wrist of the user P or the like.

The carry measuring device 2 detects, on the basis of a signal output from the sensor device 3, a swing during a shot performed by the user P using the club C. In this embodiment, the shot means an act of flying (hitting) a ball with a swing motion (which may be referred to as stroke as well). A hit ball means a ball flown (hit) by the shot. A shot position means a place where the ball is hit. A ball stop position (or simply a stop position) means a position where the hit ball stops (a stop position of the ball after the shot). In this embodiment, the club C includes a driver, an iron, and a putter. The shot includes putting by a putter or the like besides a shot by a driver and the like.

The carry measuring device 2 measures a ball stop position and measures a carry of a hit ball on the basis of a signal output from a GPS (Global Positioning System) receiving section 11 explained below. The carry measuring device 2 can be realized by a portable terminal such as a smart phone or a tablet.

The sensor device 3 includes a plurality of motion sensors 5 that detect movements of a measurement target object and output signals. In this embodiment, the plurality of motion sensors are an angular velocity sensor (referred to as gyro sensor as well) and an acceleration sensor. The angular velocity sensor detects angular velocity around a detection axis and outputs an output signal corresponding to the magnitude of the detected angular velocity. In this embodiment, the angular velocity sensor detects angular velocities around three axes (an x axis, a y axis, and a z axis). The acceleration sensor detects acceleration in a detection axis direction and outputs an output signal corresponding to the magnitude of the detected acceleration. In this embodiment, the acceleration sensor detects accelerations in three-axis (x-axis, y-axis, and z-axis) directions.

Figures 2, 3:
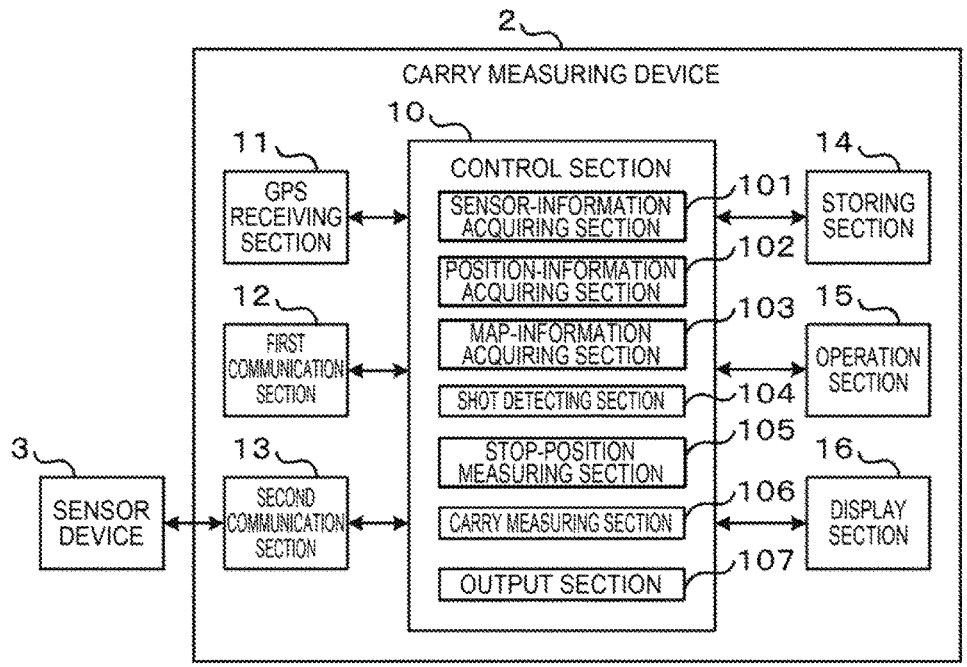
FIG. 2 is a block diagram showing an example of the configuration of the carry measuring system.
FIG. 3 is a diagram showing an example of a data structure of shot information.

FIG. 2 is a block diagram showing an example of the configuration of the carry measuring system.

The carry measuring device 2 includes a control section 10, a GPS receiving section 11, a first communication section 12, a second communication section 13, a storing section 14, an operation section 15, and a display section 16.

The GPS receiving section 11 receives a signal from a GPS satellite, calculates present position information (e.g., latitude and longitude) on the basis of the received signal, and outputs the present position information. For example, the GPS receiving section 11 cyclically receives the signal and outputs the present position information. The GPS receiving section 11 can be realized by, for example, a GPS receiver.

The first communication section 12 is connected to a cellular phone line or a network such as the Internet and performs transmission and reception of information. The first communication section 12 can be realized by, for example, a network interface device.

The second communication section 13 is connected to the sensor device 3 and performs reception of a sensor signal and transmission and reception of a control signal. The second communication section 13 can be realized by, for example, a network interface device.

The storing section 14 stores data and the like used for processing by the control section 10. The storing section 14 can be realized by a nonvolatile storage device such as a flash ROM (Read Only Memory).

In this embodiment, information concerning a shot of a user is stored in the storing section 14. FIG. 3 is a diagram showing an example of a data structure of shot information. Shot information 140 includes a record that associates a hole number 141 for identifying a hole included in a golf course, a shot number 142 indicating the number of times and the order of shots in the hole, a stop position 143 indicating a position on a map where a ball flown by the shot stops, and a carry 144 of the ball flown by the shot. The map is a map of the golf course and includes a map of holes included in the golf course. The map includes, concerning the holes, types of areas included in the holes (e.g., a tee-in ground, a fairway, a rough, a bunker, a green, and a cup), coordinate ranges of the areas, and the like.

Referring back to FIG. 2, the operation section 15 receives an operation input of the user and outputs an operation signal corresponding to the operation to the control section 10. The operation section 15 can be realized by an input device such as keys, a touch sensor, or a touch panel.

The display section 16 displays a screen. The display section 16 can be realized by, for example, an LCD (Liquid Crystal Display) or an organic EL (Electro-Luminescence) display.

The control section 10 comprehensively controls the carry measuring device 2. The control section 10 includes a sensor-information acquiring section (equivalent to the first acquiring section according to the invention) 101, a position-information acquiring section (equivalent to the second acquiring section according to the invention) 102, a map-information acquiring section (equivalent to the third acquiring section according to the invention) 103, a shot detecting section 104, a stop-position measuring section (equivalent to the position measuring section according to the invention) 105, a carry measuring section 106, and an output section 107.

The control section 10 can be realized by a computer including, for example, a CPU (Central Processing Unit), which is an arithmetic unit, a RAM (Random Access Memory), which is a volatile storage device, a ROM, which is a nonvolatile storage device, an interface (I/F) circuit that connects the control section 10 and other units, and a bus that connects the CPU, the RAM, the ROM, and the interface circuit to one another. The computer may include various dedicated processing circuits such as an image processing circuit. The control section 10 may be realized by an ASIC (Application Specific Integrated Circuit) or the like.

At least a part of the functions of the control section 10 (the sensor-information acquiring section 101, the position-information acquiring section 102, the map-information acquiring section 103, the shot-detecting section 104, the stop-position measuring section 105, the carry measuring section 106, and the output section 107) can be realized by, for example, the CPU reading out predetermined computer programs stored in the ROM to the RAM and executing the predetermined computer programs. The predetermined computer programs are, for example, application programs running on an OS (Operating System) and can be read out from a portable storage medium and installed in the carry measuring device 2 or downloaded from a server on a network and installed in the carry measuring device 2. Naturally, at least a part of the functions of the control section 10 may be realized by, for example, a dedicated processing circuit. At least apart of the functions of the control section 10 may be realized by, for example, both of the CPU and the dedicated processing circuit.

The sensor-information acquiring section 101 acquires a sensor signal from the sensor device 3 via the second communication section 13. The sensor-information acquiring section 101 acquires the sensor signal, for example, at a predetermined sampling cycle. As explained above, in this embodiment, the sensor signal includes signals corresponding to the magnitudes of the angular velocities around the three axes (the x axis, the y axis, and the z axis) and signals corresponding to the magnitudes of the accelerations in the three-axis (x-axis, y-axis, and z-axis) directions. The acquired sensor signal is stored in a storage device such as the RAM or the storing section 14.

The position-information acquiring section 102 acquires present position information from the GPS receiving section 11. The acquired position information is stored in the storage device such as the RAM or the storing section 14.

The map-information acquiring section 103 acquires map information of a golf course from a server or the like on a network via the first communication section 12. The acquired map information is stored in the storage device such as the RAM or the storing section 14.

The shot detecting section 104 detects a shot on the basis of the acquired sensor signal. In this embodiment, the shot detecting section 104 detects a swing during the shot, detects timing of an impact when a club head hits a ball in a swing motion, and detects this timing as timing of the shot. A detection procedure of the shot is not particularly limited. For example, a procedure explained below can be adopted.

First, the shot detecting section 104 determines, for example, whether the angular velocities around the axes and the accelerations in the axis directions are stable for a predetermined time (e.g., 2 seconds) (e.g., are within a predetermined threshold range). When determining that the angular velocities and the accelerations are stable, the shot detecting section 104 detects start timing of a swing. Naturally, a method of determining whether the sensor signal is stable is not limited to the method explained above. For example, when changes in the angular velocities around the axes and the accelerations in the axis directions coincide with or are approximate to a predetermined change pattern (e.g., a change pattern of waggle), the shot detecting section 104 may detect the start timing of the swing. Note that apart of the angular velocities around the axes and the accelerations in the axis directions maybe used rather than all of the angular velocities and all of the accelerations. For example, the shot detecting section 104 may receive an instruction for a swing start from the user or the like via the operation section 15 and detect the instruction as the start timing of the swing.

After the start timing of the swing is detected, for a predetermined time (e.g., 3 seconds), the shot detecting section 104 calculates a sum (referred to as norm) of the magnitudes of the angular velocities around the axes at every predetermined sampling cycle. The shot detecting section 104 detects, as timing of an impact, timing when the norm of the angular velocities is maximized in the predetermined time. As another method, the shot detecting section 104 differentiates the norm of the angular velocities with time at every predetermined sampling cycle. The shot detecting section 104 detects, as the timing of the impact, earlier timing of timing when a calculated value of the differential of the norm of the angular velocities is maximized and timing when the value is minimized. Naturally, a method of detecting the timing of the impact is not limited to the method explained above. For example, a part of the angular velocities around the axes may be used rather than all of the angular velocities around the axes.

As explained above, the shot detecting section 104 can detect a swing and detect timing of an impact during the swing motion as a shot.

When the shot is detected by the shot detecting section 104, the stop-position measuring section 105 acquires the present position information stored in the storage device. Note that latest present position information acquired by the position-information acquiring section 102 is stored in the storage device. The stop-position measuring section 105 sets the acquired present position information in the shot information 140 as the stop position 143 of a shot (a shot of the last time, a shot number N−1) immediately preceding the detected shot (the shot of this time, a shot number N). Note that the acquired present position information is also a shot position of the detected shot (the shot of this time, the shot number N).

The carry measuring section 106 calculates, as a carry of a hit ball, the distance between ball stop positions of continuous two shots. The carry measuring section 106 sets the calculated carry in the shot information 140 as the carry 144 of the shot (the shot of the last time, the shot number N−1) immediately preceding the detected shot (the shot of this time, the shot number N).

The output section 107 generates a screen including the shot information 140, outputs the screen to the display section 16, and causes the display section 16 to display the screen. The output section 107 may output the generated screen to an external device such as a PC (Personal Computer), a tablet PC, a smart phone, or an HMD (Head Mount Display) via the first communication section 12 or the like and cause the external device to display the screen.

An operation example of a carry measuring method executed by the carry measuring device 2 is explained.

Figure 4:
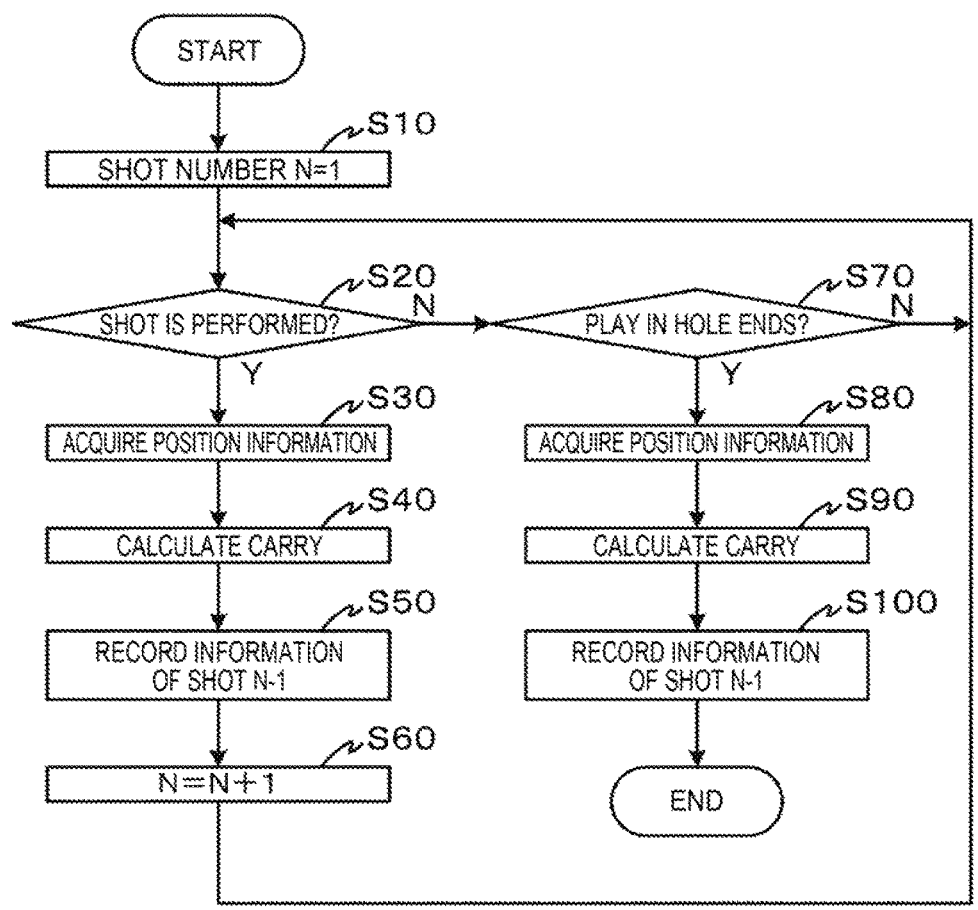
FIG. 4 is a flowchart for explaining an example of shot-information generation processing.

FIG. 4 is a flowchart for explaining an example of shot-information generation processing. The flowchart is started, for example, when a golf course and a hole number are designated by the user.

Note that a sensor signal is acquired by the sensor-information acquiring section 101 at a predetermined sampling cycle and stored in the storage device. Present position information is cyclically acquired by the position-information acquiring section 102. Latest present position information is stored in the storage device. Map information of the designated golf course is acquired by the map-information acquiring section 103 and stored in the storage device.

First, the shot detecting section 104 sets the shot number N to 1 (step S10).

Then, the shot detecting section 104 determines whether a shot is performed (step S20). Specifically, as explained above, the shot detecting section 104 performs, on the basis of the sensor signal, processing for detecting start timing of a swing and timing of an impact during the swing. When detecting timing of an impact, the shot detecting section 104 determines that a shot is performed.

If it is determined that the shot is performed (Y in step S20), the stop-position measuring section 105 acquires the latest present position information stored in the storage device (step S30). The carry measuring section 106 calculates a carry of the shot (step S40). Specifically, the carry measuring section 106 calculates a difference between the stop position 143 of the shot number N−2 included in the shot information 140 and the stop position (the stop position of the shot number N−1) acquired in step S30 to calculate a carry of the shot number N−1. Note that, when the shot number is or more, the carry measuring section 106 executes the processing in step S40.

Information concerning the shot N−1 is recorded (step S50). Specifically, the shot detecting section 104 adds, to the shot information 140, a record including the designated hole number and a shot number obtained by subtracting 1 from the set shot number N. The stop-position measuring section 105 sets the present position information acquired in step S30 in the added record as the stop position 143. The carry measuring section 106 sets the carry calculated in step S40 in the added record as the carry 144.

For example, as shown in FIG. 3, when a first stroke is performed, a record of a shot number "0" is added to the shot information 140. A stop position at a point of a zero-th stroke is set (a carry is not set). When a second stroke is performed, a record of a shot number "1" is added to the shot information 140. A stop position and a carry of a ball flown by the first stroke are set. In this way, when an N-th stroke is performed, a record of the shot number N−1 is added to the shot information 140. A stop position and a carry of a ball flown by an N−1-th stroke are set.

Referring back to FIG. 4, the shot detecting section 104 adds 1 to the shot number N (step S60) and executes the processing in step S20 again.

If determining that a shot is not performed (N in step S20), the shot detecting section 104 determines whether a play in the designated hole ends (step S70). Specifically, for example, the shot detecting section 104 receives an instruction for a hole end from the user via the operation section 15 and detects the end of the hole. In this case, for example, when the ball is shot into a cup, beside the cup, the user only has to input the instruction for the hole end from the operation section 15. Naturally, a method of detecting the hole end is not limited. For example, when detecting predetermined changes in angular velocity and acceleration on the basis of a sensor signal, the shot detecting section 104 may detect the end of the hole. In this case, for example, when the ball is shot into a cup, beside the cup, the user only has to perform a predetermined gesture motion using a club.

If determining that the play in the hole does not end (N in step S70), the shot detecting section 104 executes the processing in step S20 again.

When it is determined that the play in the hole ends (Y in step S70), the stop-position measuring section 105 acquires the latest present position information stored in the storage device (step S80). The carry measuring section 106 calculates a carry of the shot (step S90). Specifically, the carry measuring section 106 calculates a distance between the stop position 143 of the shot number N−2 included in the shot information 140 and the stop position (the stop position of the shot number N−1) acquired in step S80 to calculate a carry of the shot number N−1. Note that, when the shot number N is 2 or more, the carry calculating section 106 executes the processing in step S90.

Information concerning the shot N−1 is recorded (step S100). Specifically, the shot detecting section 104 adds, to the shot information 140, a record including the designated hole number and a shot number obtained by subtracting 1 from the set shot number N. The stop-position measuring section 105 sets the present position information acquired in step S80 in the added record as the stop position 143. The carry measuring section 106 sets, as the carry 144, the carry calculated in step S90 in the record added to the shot information 140. After the end of step S100, the shot detecting section 104 ends the processing shown in the flowchart.

Note that, for example, as shown in FIG. 3, when the end of the play in the designated hole is designated after a fourth stroke, a record of a shot number "4" is added to the shot information 140. A stop position and a carry of a ball putted by the fourth stroke are set.

The shot-information generation processing explained above is executed for each of designated holes. Shot information of the holes is stored in the storage device.

Figure 5:
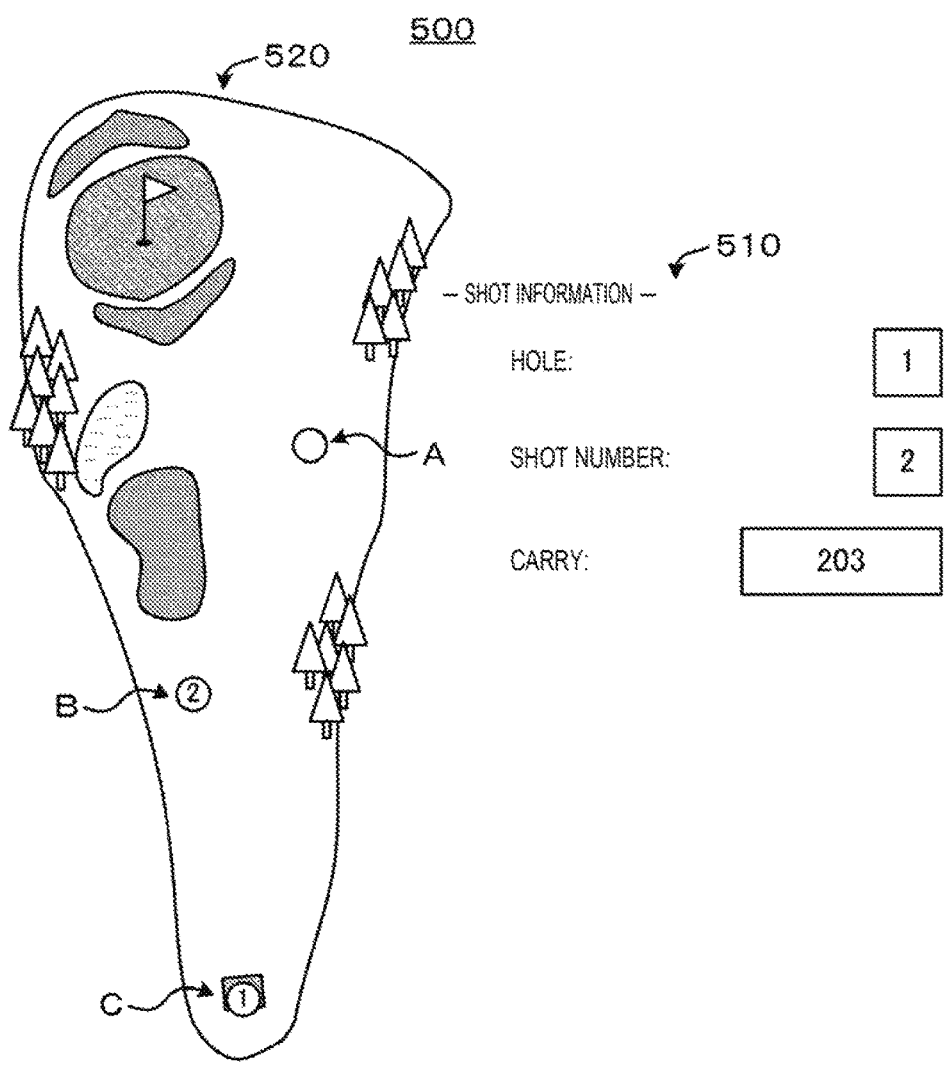
FIG. 5 is a diagram showing an example of a screen on which the shot information is displayed.

The output section 107 generates, according to operation by the user, for example, a screen 500 shown in FIG. 5 (a diagram showing an example of a screen on which shot information is displayed), outputs the screen 500 to the display section 16, and causes the display section 16 to display the screen 500.

A shot information region 510, a hole image region 520, and the like are included in the screen 500.

The output section 107 displays a hole number, a shot number in a hole indicated by the hole number, and a carry of the shot in the shot information region 510. For example, the output section 107 receives designation of a hole number and a shot number via the operation section 15 and displays the designated hole number and the designated shot number in the shot information region 510. The output section 107 acquires a carry associated with the designated hole number and the designated shot number from the shot information 140 and displays the carry in the shot information region 510.

The output section 107 displays, on the basis of map information of a hole indicated by the designated hole number, a map of the hole in the hole image region 520. The output section 107 acquires at least a stop position associated with the designated hole number and the designated shot number from the shot information 140 and displays an image indicating the stop position on the map in association with a map coordinate. Note that the output section 107 may display, in addition to the stop position associated with the designated shot number, a stop position associated with a shot number immediately preceding or second or subsequently immediately preceding the shot number. In the example shown in FIG. 5, "2" is designated in the shot number, a stop position A of a ball of a shot number "2", a stop position B of a ball of a shot number "1", and a stop position C of a ball of a shot number "0" are displayed on the map of the hole.

The first embodiment of the invention is explained above. According to this embodiment, for example, the carry measuring device detects a shot by a player, acquires position information at the time when the shot is detected, and measures a carry on the basis of the acquired position information. Consequently, it is possible to easily and accurately measure a carry of a hit ball without work of the player.

According to this embodiment, for example, the carry measuring device measures a shot position of an N-th shot as a ball stop position after an N−1-th shot. Consequently, it is possible to sequentially record stop positions of the ball of shots and carries of the ball.

According to this embodiment, for example, the carry measuring device detects timing of an impact during a swing and acquires position information on the basis of the timing. Consequently, it is possible to more accurately detect a shot position. According to this embodiment, for example, the carry measuring device detects an end of a hole on the basis of a senor signal or on the basis of a predetermined operation input and measures position information at that time as a ball stop position after the last shot. Consequently, since it is possible to determine a ball stop position of a last shot in the hole, it is possible to measure ball stop positions and carries of all shots in the holes.

Second Embodiment

In a second embodiment, in addition to a ball stop position and a carry of a shot, a hit ball direction of the shot is calculated. In the following explanation, components same as the components in the first embodiment are denoted by the same reference numerals and signs and explanation of the components is omitted. Differences from the first embodiment are mainly explained.

Figure 6:
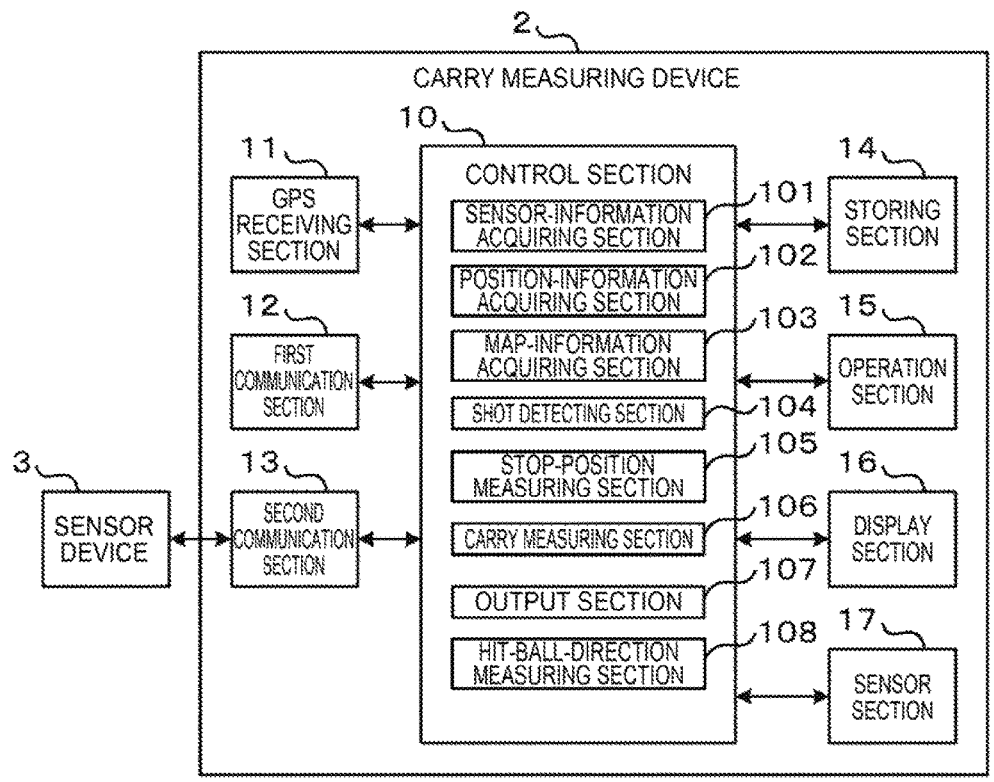
FIG. 6 is a block diagram showing an example of the configuration of a carry measuring system according to a second embodiment of the invention.

FIG. 6 is a block diagram showing an example of the configuration of a carry measuring system according to a second embodiment of the invention.

The carry measuring device 2 includes a sensor section 17 in addition to the sections explained in the first embodiment. The control section 10 includes a hit-ball-direction measuring section 108.

The sensor section 17 includes a magnetic sensor (which may be referred to as orientation sensor as well) that detects terrestrial magnetism and outputs a signal. The magnetic sensor detects, for example, terrestrial magnetisms of two axes (an x axis: the left-right direction, a y axis: the front-back direction) or three axes (an x axis: the left-right direction, a y axis: the front-back direction, a z axis: the up-down direction) and outputs an output signal corresponding to the magnitudes of the detected terrestrial magnetisms. The sensor section 17 includes a three-axis acceleration sensor. Note that the magnetic sensor and the acceleration sensor may be provided as sensor sections separate from each other.

Figures 7, 8:
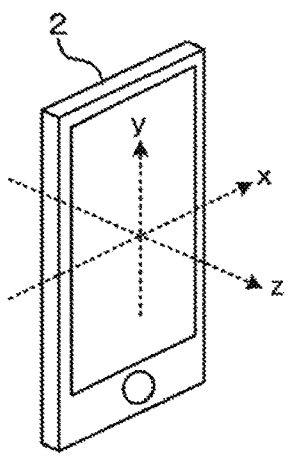
FIG. 7 is a diagram showing an example of a data structure of shot information.
FIG. 8 is a diagram for explaining an example of a method of calculating a target direction.

In the storing section 14, the shot information 140 shown in FIG. 7 (a diagram showing an example of a data structure of shot information) is stored. The shot information 140 includes a hit ball direction 145 of a ball flown by a shot in addition to the date items explained in the first embodiment. In this embodiment, the hit ball direction 145 is a direction relative to a target direction set as a reference direction (a direction in which a player hits a ball, for example, the right direction in front view of the player). For example, the hit ball direction 145 can be represented by left and right rotation angles with respect to the target direction.

Referring back to FIG. 6, the sensor-information acquiring section 101 acquires a sensor signal from the sensor section 17. For example, the sensor-information acquiring section 101 acquires the sensor information at a predetermined sampling cycle. As explained above, in this embodiment, the sensor signal includes a signal corresponding to the magnitudes of terrestrial magnetisms in the two-axis or three-axis directions and a signal corresponding to the magnitudes of accelerations in the three-axis directions. The acquired sensor signal is stored in the storage device such as the RAM or the storing section 14.

When a shot is detected, the hit-ball-direction measuring section 108 calculates a target direction of the shot on the basis of a signal of the magnetic sensor and a signal of the acceleration sensor. The target direction of the shot is stored in the storage medium. For example, as shown in FIG. 8 (a diagram for explaining an example of a method of calculating the target direction), the normal direction of the display section 16 of the carry measuring device 2 is set as a Z axis. The carry measuring device 2 is attached to the body of the player (e.g., attached to the right waist as shown in FIG. 1) such that the Z axis coincides with a direction in which the player hits a ball. The hit-ball-direction measuring section 108 calculates the orientation of the Z axis as the target direction on the basis of the signal of the magnetic sensor and the signal of the acceleration sensor. As a method of calculating an orientation using the magnetic sensor and the acceleration sensor, a general technique only has to be used. Therefore, explanation of the method is omitted. Naturally, the orientation of the Z axis may be calculated using only the three-axis magnetic sensor.

When the shot is detected, the hit-ball-direction measuring section 108 calculates, as a hit ball direction, an orientation indicated by a straight line connecting ball stop positions of continuous two shots (an orientation from the preceding stop position to the following stop position). The hit-ball-direction measuring section 108 calculates a difference between the calculated target direction (orientation) of the shot and the hit ball direction (orientation) and calculates a hit ball direction of the shot (left and right rotation angles with respect to the target direction). The hit-ball-direction measuring section 108 sets the calculated hit ball direction in the shot information 140 as the hit ball direction 145 of a shot (the shot number N−1) immediately preceding the detected shot (the shot number N).

Figure 9:
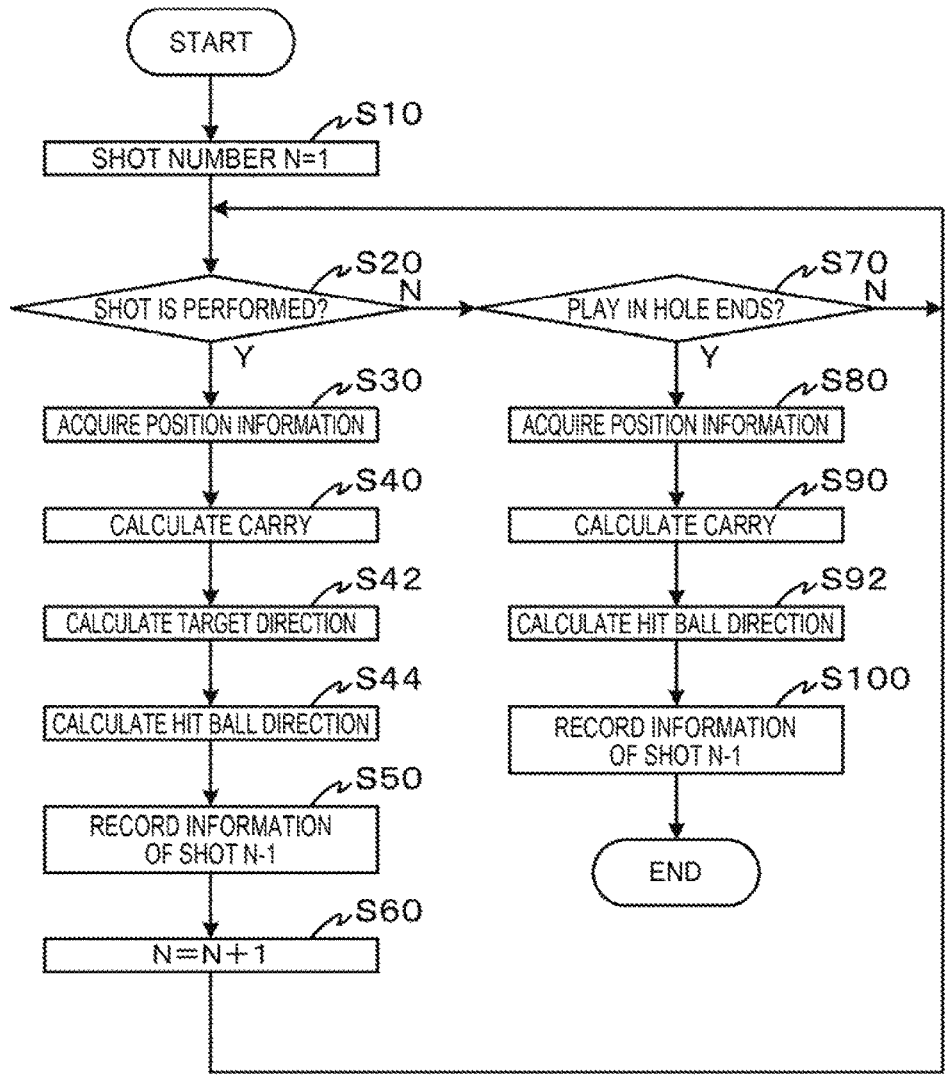
FIG. 9 is a flowchart for explaining an example of shot-information generation processing.

FIG. 9 is a flowchart for explaining an example of shot-information generation processing. Steps S10 to S40, steps S50 to S60, steps S70 to S90, and step S100 are the same as the steps shown in FIG. 4. Therefore, explanation of the steps is omitted.

Note that the sensor signal from the sensor section 17 is acquired by the sensor-information acquiring section 101 at a predetermined sampling cycle and stored in the storage device.

After step S40, the hit-ball-direction measuring section 108 calculates a target direction (step S42). Specifically, the hit-ball-direction measuring section 108 calculates a target direction of the shot of the shot number N on the basis of the sensor signal (the sensor signal from the sensor section 17) at the start timing point of the swing detected by the shot detecting section 104 in step S20. The calculated target direction of the shot number N is stored in the storage device.

The hit-ball-direction measuring section 108 calculates a hit ball direction (step S44). Specifically, the hit-ball-direction measuring section 108 calculates an orientation of a straight line connecting the stop position 143 of the shot number N−2 included in the shot information 140 and the stop position (the stop position of the shot number N−1) acquired in step S30 to calculate a hit ball direction of the shot number N−1. The hit-ball-direction measuring section 108 calculates a difference between the target direction of the shot number N−1 stored in the storage device by the processing in step S42 and the calculated shot direction of the shot number N−1 to calculate the hit ball direction of the shot number N−1 (left and right rotation angles with respect to the target direction). Note that, when the shot number N is 2 or more, the hit-ball-direction measuring section 108 executes the processing in step S44.

Note that, in step S50, the hit-ball-direction measuring section 108 sets, as the hit ball direction 145, the hit ball direction (the left and right rotation angles with respect to the target direction) calculated in step S44 in the record (the record of the shot number N−1) added to the shot information 140.

After step S90, the hit-ball-direction measuring section 108 calculates a hit ball direction (step S92). Specifically, the hit-ball-direction measuring section 108 calculates an orientation of a straight line connecting the stop position 143 of the shot number N−2 included in the shot information 140 and the stop position (the stop position of the shot number N−1) acquired in step S80 to calculate a shot direction of the shot number N−1. The hit-ball-direction measuring section 108 calculates a difference between the target direction of the shot number N−1 stored in the storage device by the processing in step S42 and the calculated shot direction of the shot number N−1 to calculate the hit ball direction of the shot number N−1 (the left and right rotation angles with respect to the target direction). Note that, when the shot number N is 2 or more, the hit-ball-direction measuring section 108 executes the processing in step S92.

Note that, in step S100, the hit-ball-direction measuring section 108 sets, as the hit ball direction 145, the hit ball direction (the left and right rotation angles with respect to the target direction) calculated in step S92 in the record (the record with the shot number N−1) added to the shot information 140.

Figure 10:
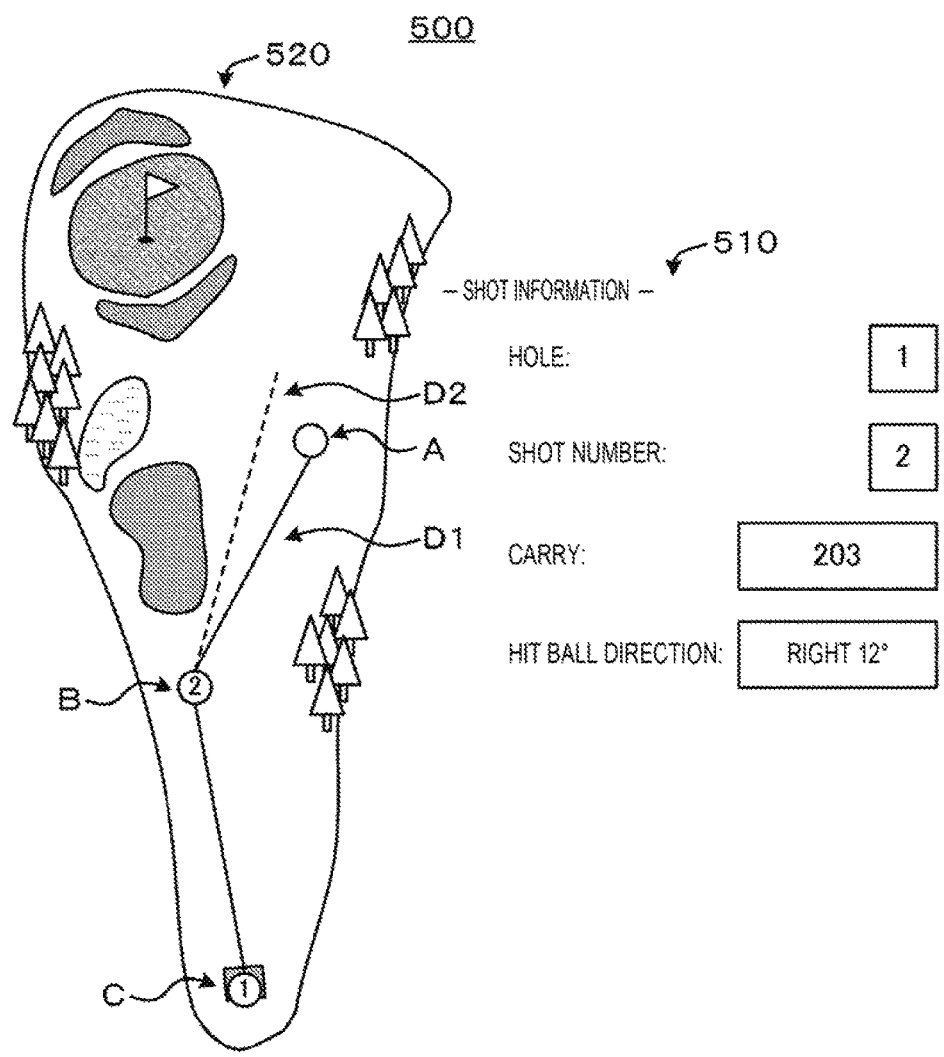
FIG. 10 is a diagram showing an example of a screen on which the shot information is displayed.

The output section 107 generates the screen 500 shown in FIG. 10 (a diagram showing an example of a screen on which shot information is displayed) according to operation by the user and causes the display section 16 to display the screen 500.

Unlike FIG. 5, in the shot information region 510, in addition to a hole number, a shot number in a hole indicated by the hole number, and a carry of the shot, a hit ball direction of the shot is displayed. For example, the output section 107 acquires, from the shot information 140, a carry and a hit ball direction associated with the designated shot number and the designated shot number and displays the carry and and the hit ball direction in the shot information region 510. In the example shown in FIG. 10, the hit ball direction of the shot number "2" is displayed as "right 12°".

The output section 107 displays, on the map of the hole displayed in the hole image region 520, at least a stop position associated with a designated shot number and a stop position associated with a shot number immediately preceding the shot number. The output section 107 displays an image indicating a hit ball direction connecting the stop position of the designated shot number and the stop position of the shot number immediately preceding the shot number. The output section 107 displays an image indicating, starting from a shot position of the designated shot number, a target direction of the shot number. In the example shown in FIG. 10, "2" is designated as the shot number and, on the map of the hole, a hit ball direction image D1 connecting the stop position A of the ball of the shot number "2" and the stop position B of the ball of the shot number "1" and a target direction image D2 starting from the shot portion B of the shot number "2" are displayed.

The second embodiment of the invention is explained above. According to this embodiment, for example, when a shot is detected, the carry measuring device measures a target direction, measures a hit ball direction on the basis of ball stop positions of continuous shots, and measures a relative hit ball direction with respect to the target direction on the basis of a difference between the target direction and the hit ball direction. Consequently, it is possible to easily and accurately calculate a hit ball direction.

Third Embodiment

In a third embodiment, in addition to a ball stop position and a carry of a shot and a hit ball direction, an area where a ball flown by the shot is located is calculated.

Figure 11:
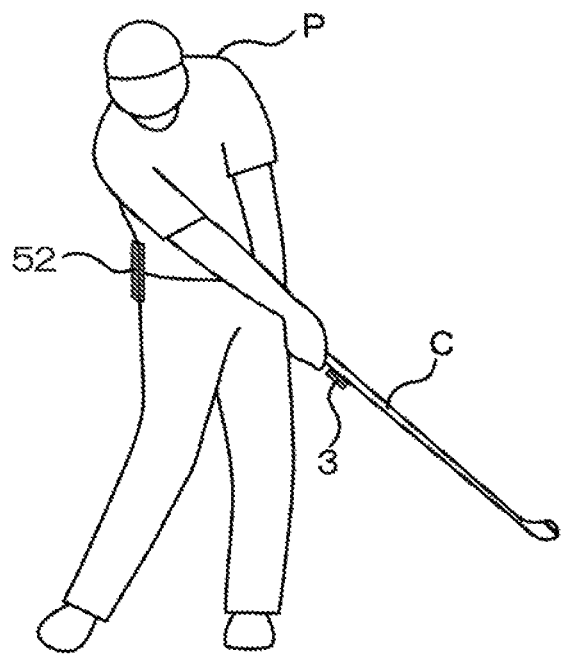
FIG. 11 is a diagram showing an example of the exterior of a hit-ball determining system according to a third embodiment of the invention.

FIG. 11 is a diagram showing an example of the exterior of a hit-ball determining system according to the third embodiment of the invention. In the following explanation, the hit-ball determining system according to this embodiment is explained with reference to the drawings. Note that components same as the components in the embodiments explained above are denoted by the same reference numerals and signs and redundant explanation of the components is omitted.

In FIG. 11, a hit-ball determining system 51 includes a hit-ball determining device 52 and the sensor device 3. The hit-ball determining device 52 and the sensor device 3 are communicably connected to each other by wire or radio. In the example shown in FIG. 11, the hit-ball determining device 52 is attached to the waist of the user P and the sensor device 3 is attached to the club C. However, an attaching position of the hit-ball determining device 52 is not particularly limited.

The hit-ball determining device 52 detects, on the basis of a signal output from the sensor device 3, a swing during a shot performed by the user P using the club C.

On the basis of a signal output from the GPS receiving section 11, the hit-ball determining device 52 measures a ball stop position and determines an area where a hit ball is present.

The sensor device 3 includes a plurality of motion sensors that detect a movement of a measurement target object and output a signal. In this embodiment, the sensor device 3 includes an angular velocity sensor (a gyro sensor) and an acceleration sensor as the plurality of motion sensors.

Figure 12:
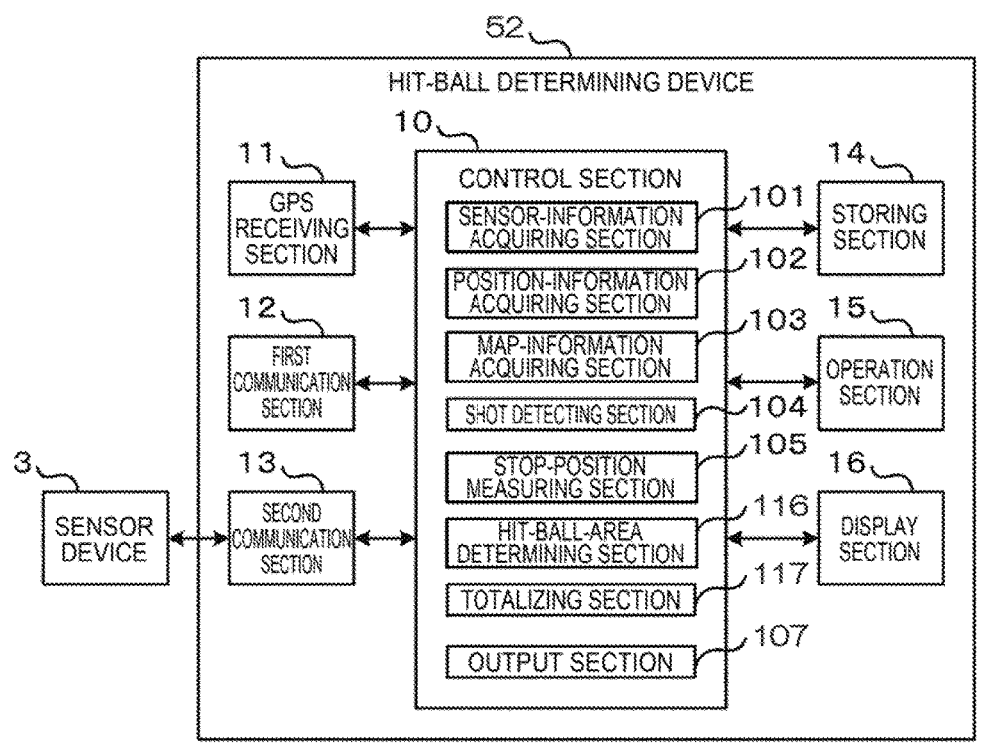
FIG. 12 is a block diagram showing an example of the configuration of the hit-ball determining system.

FIG. 12 is a block diagram showing an example of the configuration of the hit-ball determining system.

The hit-ball determining device 52 includes the control section 10, the GPS receiving section 11, the first communication section 12, the second communication section 13, the storing section 14, the operation section 15, and the display section 16.

The GPS receiving section 11 receives a signal from a GPS satellite, calculates present position information on the basis of the received signal, and outputs the present position information.

The first communication section 12 is connected to a cellular phone line or a network such as the Internet and performs transmission and reception of information.

The second communication section 13 is connected to the sensor device 3 and performs reception of a sensor signal and transmission and reception of a control signal.

The storing section 14 stores data and the like used for processing by the control section 10. In this embodiment, information concerning a shot of a user is stored in the storing section 14. FIG. 13 is a diagram showing an example of a data structure of the shot information. The shot information 140 includes a record that associates the hole number 141 for identifying a hole included in a golf course, the shot number 142 indicating the number of times and the order of shots in the hole, the stop position 143 indicating a position on a map where a ball flown by the shot stops, and a hit ball area 146 indicating a type of an area where the ball flown by the shot is located. The map is a map of the golf course and includes a map of holes included in the golf course. The map includes, concerning the holes, types of areas included in the holes and coordinate ranges of the areas.

Referring back to FIG. 12, the operation section 15 receives an operation input of the user and outputs an operation signal corresponding to the operation to the control section 10.

The display section 16 displays a screen. The display section 16 can be realized by, for example, an LCD (Liquid Crystal Display) or an organic EL (Electro-Luminescence) display.

The control section 10 comprehensively controls the hit-ball determining device 52. The control section 10 includes the sensor-information acquiring section (equivalent to the first acquiring section according to the invention) 101, the position-information acquiring section (equivalent to the second acquiring section according to the invention) 102, the map-information acquiring section (equivalent to the third acquiring section according to the invention) 103, the shot detecting section 104, the stop-position measuring section (equivalent to the position measuring section according to the invention) 105, a hit-ball-area determining section (equivalent to the area determining section according to the invention) 116, a totalizing section 117, and the output section 107.

The control section 10 can be realized by a computer including, for example, a CPU, which is an arithmetic unit, a RAM, which is a volatile storage device, a ROM, which is a nonvolatile storage device, an interface (I/F) circuit that connects the control section 10 and other units, and a bus that connects the CPU, the RAM, the ROM, and the interface circuit to one another. The computer may include various dedicated processing circuits such as an image processing circuit. The control section 10 may be realized by an ASIC or the like.

At least a part of the functions of the control section 10 (the sensor-information acquiring section 101, the position-information acquiring section 102, the map-information acquiring section 103, the shot-detecting section 104, the stop-position measuring section 105, the hit-ball-area determining section 116, the totalizing section 117, and the output section 107) can be realized by, for example, the CPU reading out predetermined computer programs stored in the ROM to the RAM and executing the predetermined computer programs. The predetermined computer programs are, for example, application programs running on an OS and can be read out from a portable storage medium and installed in the hit-ball determining device 52 or downloaded from a server on a network and installed in the hit-ball determining device 52. Naturally, at least a part of the functions of the control section 10 may be realized by, for example, a dedicated processing circuit. At least a part of the functions of the control section 10 may be realized by, for example, both of the CPU and the dedicated processing circuit.

The sensor-information acquiring section 101 acquires a sensor signal from the sensor device 3 via the second communication section 13. The sensor-information acquiring section 101 acquires the sensor signal, for example, at a predetermined sampling cycle.

The position-information acquiring section 102 acquires present position information from the GPS receiving section 11. The acquired position information is stored in the storage device such as the RAM or the storing section 14.

The map-information acquiring section 103 acquires map information of a golf course from a server or the like on a network via the first communication section 12. The acquired map information is stored in the storage device such as the RAM or the storing section 14.

The shot detecting section 104 detects a shot on the basis of the acquired sensor signal. As a detection procedure for a shot, a procedure same as the procedure in the embodiments explained above can be adopted.

When the shot is detected by the shot detecting section 104, the stop-position measuring section 105 acquires the present position information stored in the storage device. Note that latest present position information acquired by the position-information acquiring section 102 is stored in the storage device. The stop-position measuring section 105 sets the acquired present position information in the shot information 140 as the stop position 143 of a shot (a shot of the last time, the shot number N−1) immediately preceding the detected shot (the shot of this time, the shot number N).

The hit-ball area determining section 116 determines on the basis of a ball stop position of a shot and the map information of the golf course stored in the storage device in which area the stop position is included. The hit-ball area determining section 116 sets a type of the determined area in the shot information 140 as the hit ball area 146 of the shot corresponding to the area.

The totalizing section 117 calculates various kinds of information concerning golf on the basis of the shot information 140. Note that the map information of the golf course includes information such as a prescribed number of strokes of holes.

For example, concerning the holes (excluding holes of par 3), the totalizing section 117 divides the number of holes, the hit ball area 146 of which is "fairway", by a total number of holes (excluding the holes of par 3) and calculates a fairway keep ratio with reference to the hit ball area 146 of a record, the shot number 142 of which is "1". For example, concerning the holes, the totalizing section 117 divides the number of holes, the hit ball area 146 of which is "green", by the total number of holes and calculates a par-on ratio with reference to the hit ball area 146 of a record of the shot number 142 corresponding to specified numbers of strokes (e.g., one stroke in the holes of par 3, two strokes or one stroke in holes of par 4, and three strokes, two strokes, or one stroke in holes of par 5).

Naturally, the totalizing section 117 may calculate, on the basis of the shot information 140, various indexes such as an average stroke (an average stroke per one round), an average putt (an average number of pars per one hole), a par keep ratio (the number of holes of par or higher scores/a total number of holes), a birdie ratio (the number of holes of birdie or higher scores/a total number of rounds), an eagle ratio (a total number of rounds/the number of eagles), a recovery ratio (the number of holes where a player did not achieve par-on but scored par or higher scores/the number of holes where the player did not achieve par-on), and a sand save ratio (the number of holes where the player did not shot a ball into a cup within two strokes from a bunker on a green side/the number of holes where the player shot a ball into a cup from a bunker on a green side).

The output section 107 generates a screen including the shot information 140 and the various indexes, outputs the screen to the display section 16, and causes the display section 16 to display the screen. The output section 107 may output the generated screen to an external device such as a PC, a tablet PC, a smart phone, or an HMD via the first communication section 12 or the like and cause the external device to display the screen.

An operation example of the hit-ball determining device 52 is explained.

Figure 14:
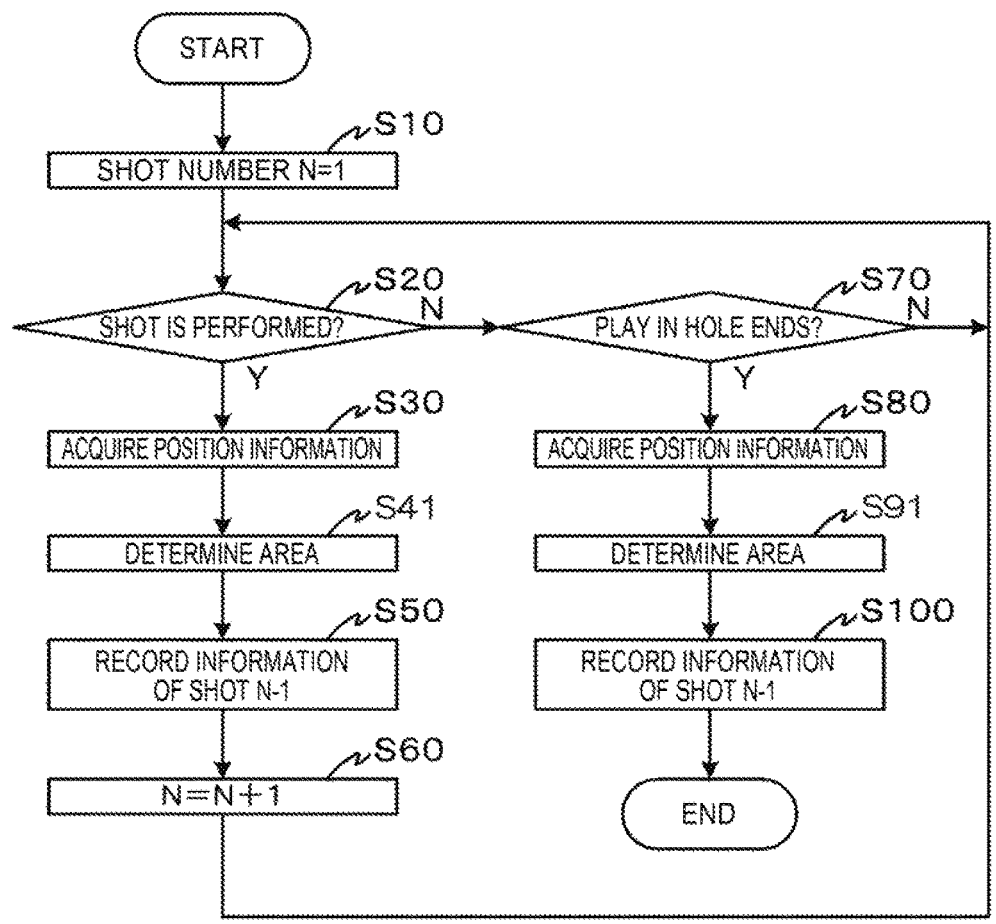
FIG. 14 is a flowchart for explaining an example of shot-information generation processing.

FIG. 14 is a flowchart for explaining an example of shot-information generation processing. The flowchart is started, for example, when a golf course and a hole number are designated by the user.

Note that a sensor signal is acquired by the sensor-information acquiring section 101 at a predetermined sampling cycle and stored in the storage device. Present position information is cyclically acquired by the position-information acquiring section 102. Latest present position information is stored in the storage device. Map information of the designated golf course is acquired by the map-information acquiring section 103 and stored in the storage device.

First, the shot detecting section 104 sets the shot number N to 1 (step S10).

Then, the shot detecting section 104 determines whether a shot is performed (step S20). Specifically, as explained above, the shot detecting section 104 performs, on the basis of the sensor signal, processing for detecting start timing of a swing and timing of an impact during the swing. When detecting timing of an impact, the shot detecting section 104 determines that a shot is performed.

If it is determined that the shot is performed (Y in step S20), the stop-position measuring section 105 acquires the latest present position information stored in the storage device (step S30). The hit-ball-area determining section 116 determines on the basis of the present position information acquired in step S30 and the map information of the golf course stored in the storage device in which area a stop position of a ball indicated by the present position information is included (step S41).

Information concerning the shot N−1 is recorded (step S50). Specifically, the shot detecting section 104 adds, to the shot information 140, a record including the designated hole number and a shot number obtained by subtracting 1 from the set shot number N. The stop-position measuring section 105 sets the present position information acquired in step S30 in the added record as a stop position. The hit-ball-area determining section 116 sets the type of the area determined in step S41 in the added record as a hit ball area.

For example, as shown in FIG. 13, when a first stroke is performed, a record of a shot number "0" is added to the shot information 140. A stop position and a hit ball area at a point of a zero-th stroke is set. When a second stroke is performed, a record of a shot number "1" is added to the shot information 140. A stop position and a hit ball area of a ball flown by the first stroke are set. In this way, when an N-th stroke is performed, a record of the shot number N−1 is added to the shot information 140. A stop position and a hit ball area of a ball flown by an N−1-th stroke are set.

Referring back to FIG. 14, the shot detecting section 104 adds 1 to the shot number N (step S60) and executes the processing in step S20 again.

If determining that a shot is not performed (N in step S20), the shot detecting section 104 determines whether a play in the designated hole ends (step S70). Specifically, for example, the shot detecting section 104 receives an instruction for a hole end from the user via the operation section 15 and detects the end of the hole. In this case, for example, when the ball is shot into a cup, beside the cup, the user only has to input the instruction for the hole end from the operation section 15. Naturally, a method of detecting the hole end is not limited. For example, when detecting predetermined changes in angular velocity and acceleration on the basis of a sensor signal, the shot detecting section 104 may detect the end of the hole. In this case, for example, when the ball is shot into a cup, beside the cup, the user only has to perform a predetermined gesture motion using a club.

If determining that the play in the hole does not end (N in step S70), the shot detecting section 104 executes the processing in step S20 again.

When it is determined that the play in the hole ends (Y in step S70), the stop-position measuring section 105 acquires the latest present position information stored in the storage device (step S80). The hot-ball-area determining section 116 determines on the basis of the present position information acquired in step S80 and the map information of the golf course stored in the storage device in which area a stop position of a ball indicated by the present position information is included (step S91).

Information concerning the shot N−1 is recorded (step S100). Specifically, the shot detecting section 104 adds, to the shot information 140, a record including the designated hole number and a shot number obtained by subtracting 1 from the set shot number N. The stop-position measuring section 105 sets the present position information acquired in step S80 in the added record as a stop position. The hit-ball-area determining section 116 sets the type of the area determined in step S91 in the added record as a hit ball area. After the end of step S100, the shot detecting section 104 ends the processing shown in the flowchart.

Note that, for example, as shown in FIG. 13, when the end of the play in the designated hole is designated after a fourth stroke, a record of a shot number "4" is added to the shot information 140. A stop position and a hit ball area (a cup) of a ball putted by the fourth stroke are set.

The shot-information generation processing explained above is executed for each of designated holes. Shot information of the holes is stored in the storage device. Note that the totalizing section 117 calculates various indexes such as a fairway keep ratio on the basis of the shot information 140 generated by the shot-information generation processing.

Figure 15:
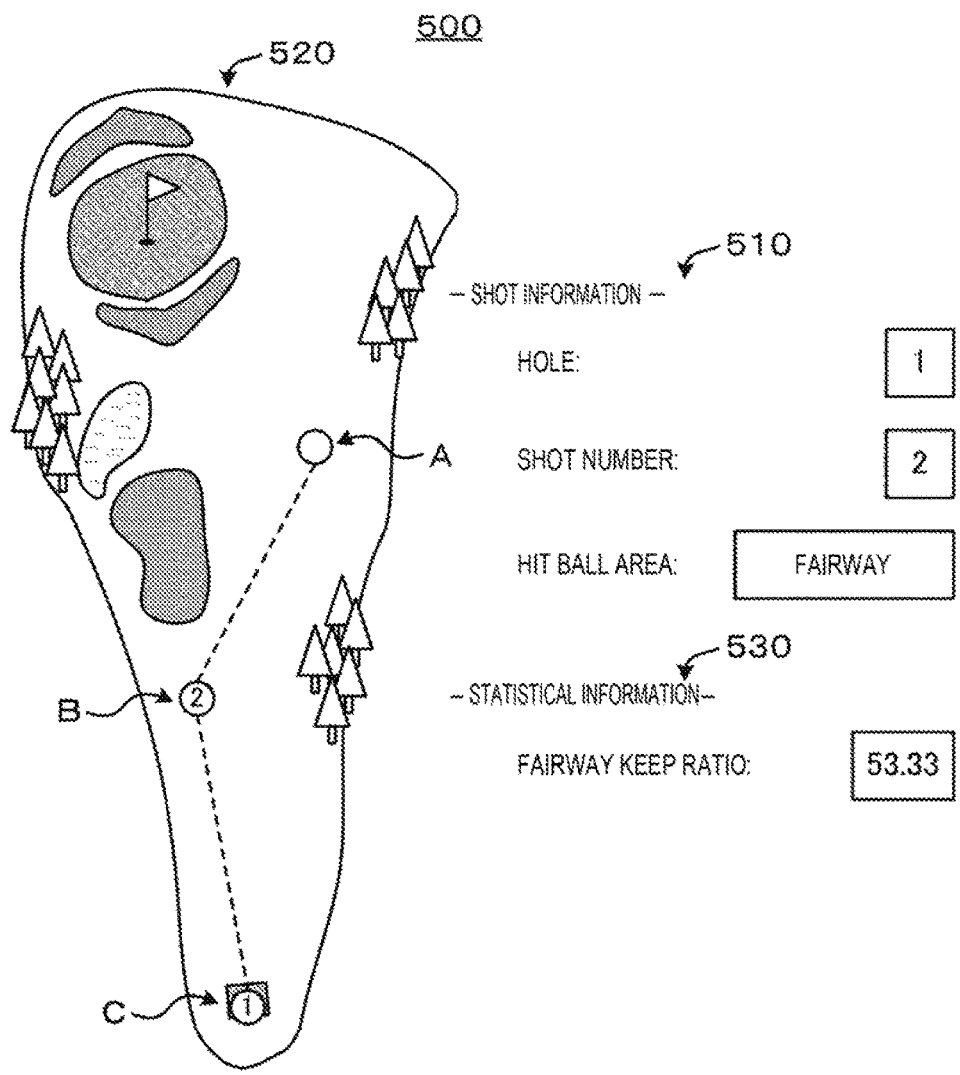
FIG. 15 is a diagram showing an example of a screen on which the shot information and statistical information are displayed.

The output section 107 generates, according to operation by the user, for example, the screen 500 shown in FIG. 15 (a diagram showing an example of a screen on which shot information and statistical information are displayed), outputs the screen 500 to the display section 16, and causes the display section 16 to display the screen 500.

The shot information region 510, the hole image region 520, a statistical information region 530, and the like are included in the screen 500.

The output section 107 displays a hole number, a shot number in a hole indicated by the hole number, and a hit ball area of a hit ball by a shot indicated by the shot number in the shot information region 510. For example, the output section 107 receives designation of a hole number and a shot number via the operation section 15 and displays the designated hole number and the designated shot number in the shot information region 510. The output section 107 acquires a hit ball area associated with the designated hole number and the designated shot number from the shot information 140 and displays the hit ball area in the shot information region 510.

The output section 107 displays, on the basis of map information of a hole indicated by the designated hole number, a map of the hole in the hole image region 520. The output section 107 acquires at least a stop position associated with the designated hole number and the designated shot number from the shot information 140 and displays an image indicating the stop position on the map in association with a map coordinate. The output section 107 may display, in addition to the stop position associated with the designated shot number, a stop position associated with a shot number immediately preceding or second or subsequently immediately preceding the shot number. In the example shown in FIG. 15, "2" is designated in the shot number, the stop position A of the ball of the shot number "2", the stop position B of the ball of the shot number "1", and the stop position C of the ball of the shot number "0" are displayed on the map of the hole.

The output section 107 displays the fairway keep ratio calculated by the totalizing section 117 in the statistical information region 530. Naturally, the output section 107 may display other indexes calculated by the totalizing section 117 in the statistical information region 530.

The third embodiment of the invention is explained above. According to this embodiment, for example, the hit-ball determining device detects a shot by a player and acquires position information at the time when the shot is detected. Consequently, it is possible to easily and accurately determine a ball stop position without work of the player. According to this embodiment, for example, the hit-ball determining device determines in which area the acquired position information is included. Consequently, it is possible to easily and accurately determine an area of the ball stop position.

According to this embodiment, for example, the hit-ball determining device measures a shot position of an N-th shot as a ball stop position after an N−1-th shot. Consequently, it is possible to sequentially record ball stop positions of shots and areas of the ball stop positions. According to this embodiment, for example, the hit-ball determining device calculates a fairway keep ratio on the basis of areas of ball stop positions of first shots in holes. Consequently, it is possible to easily present an accurate fairway keep ratio as information useful for improvement of golf play of the player. According to this embodiment, for example, the hit-ball determining device calculates a par-on ratio on the basis of areas of ball stop positions of shots corresponding specified number of shots of par-on in the holes. Consequently, it is possible to easily present an accurate par-on ratio as information useful for improvement of golf play of the player.

According to this embodiment, for example, the hit-ball determining device detects timing of an impact during a swing and acquires position information on the basis of the timing. Consequently, it is possible to more accurately detect a shot position. According to this embodiment, for example, the hit-ball determining device detects an end of a hole on the basis of a sensor signal or on the basis of a predetermined operation input and measures position information at that point as a ball stop position after a last shot. Consequently, since it is possible to determine a ball stop position of the last shot in the hole, it is possible to record ball stop positions of all shots in holes.

Fourth Embodiment

In a fourth embodiment, in addition to a ball stop position and a hit ball area of a shot, a carry of a hit ball of the shot and an evaluation of the shot are calculated. In the following explanation, components same as the components in the first embodiment are denoted by the same reference numerals and signs and explanation of the components is omitted. Differences from the embodiments, in particular, the third embodiment are mainly explained.

Figure 16:
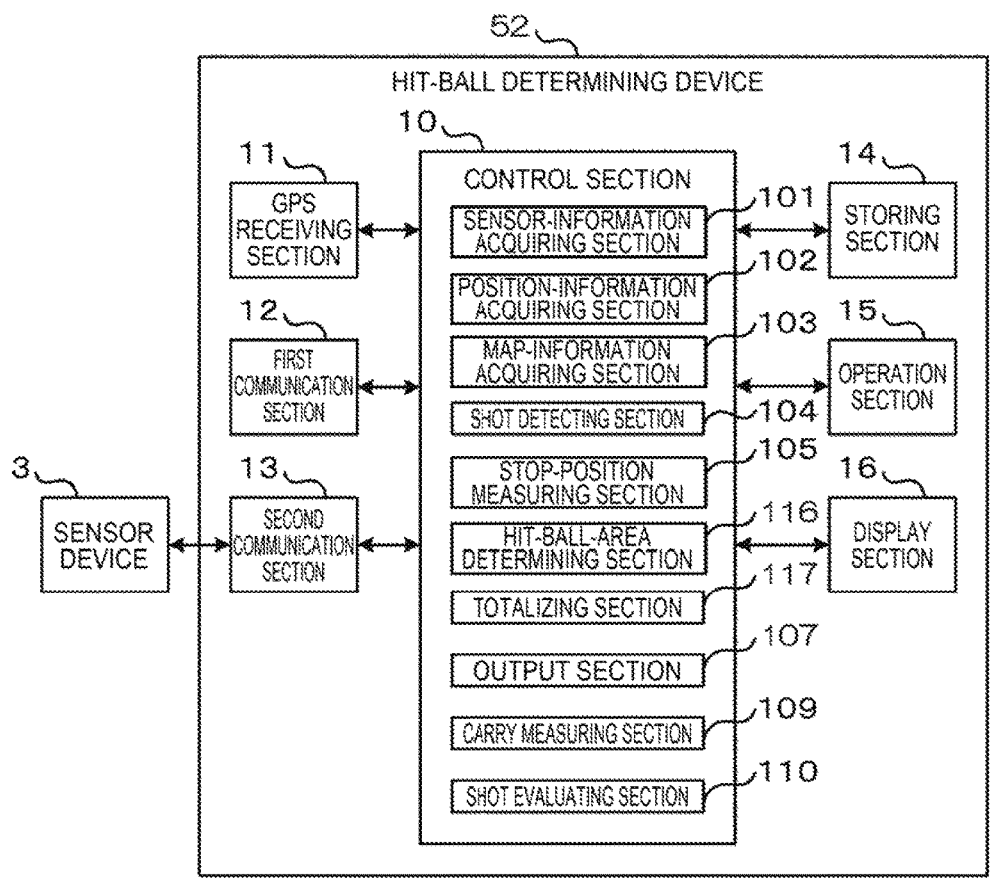
FIG. 16 is a block diagram showing an example of the configuration of a hit-ball determining system according to a fourth embodiment of the invention.

FIG. 16 is a block diagram showing an example of the configuration of a hit-ball determining system according to the fourth embodiment of the invention.

The control section 10 includes, in addition to the sections explained in the third embodiment, a carry measuring section 109 and a shot evaluating section 110.

In the storing section 14, the shot information 140 shown in FIG. 17 (a figure showing an example of a data structure of shot information) is stored. The shot information 140 includes, in addition to the data items explained in the third embodiment, the carry 144 of a ball flown by a shot and a shot evaluation 147 indicating an evaluation of the shot. In the shot evaluation 147, evaluation values (e.g., bad, fair, and good) determined by a predetermined rule are set.

Referring back to FIG. 16, the carry measuring section 109 calculates a distance between ball stop positions of continuous two shots as a carry of a hit ball. The carry measuring section 109 sets the calculated carry in the shot information 140 as the carry 144 of a shot (a shot of the last time, a shot number N-1) immediately preceding a detected shot (a shot of this time, a shot number N).

The shot evaluating section 110 evaluates, on the basis of a carry of a shot and a hit ball area of the shot, the shot according to a predetermined rule. For example, the shot evaluating section 110 calculates an average carry from the shot information 140 in the past. When the carry of the evaluation target shot exceeds the average carry and the hit ball area of the shot is "fairway", the shot evaluating section 110 evaluates the shot as "good" or "nice shot". For example, when the carry of the evaluation target shot is smaller than a predetermined distance or the hit ball area of the shot is "bunker", the shot evaluating section 110 evaluates the shot as "bad" or "miss shot". The shot evaluating section 110 sets the determined evaluation of the shot in the shot information 140 as the shot evaluation 147 of a shot corresponding to the evaluation.

Naturally, a method of evaluating a shot is not limited to the method explained above. For example, a shot may be evaluated on the basis of, for example, only a carry of the shot or only a hit ball area of the shot.

Figure 18:
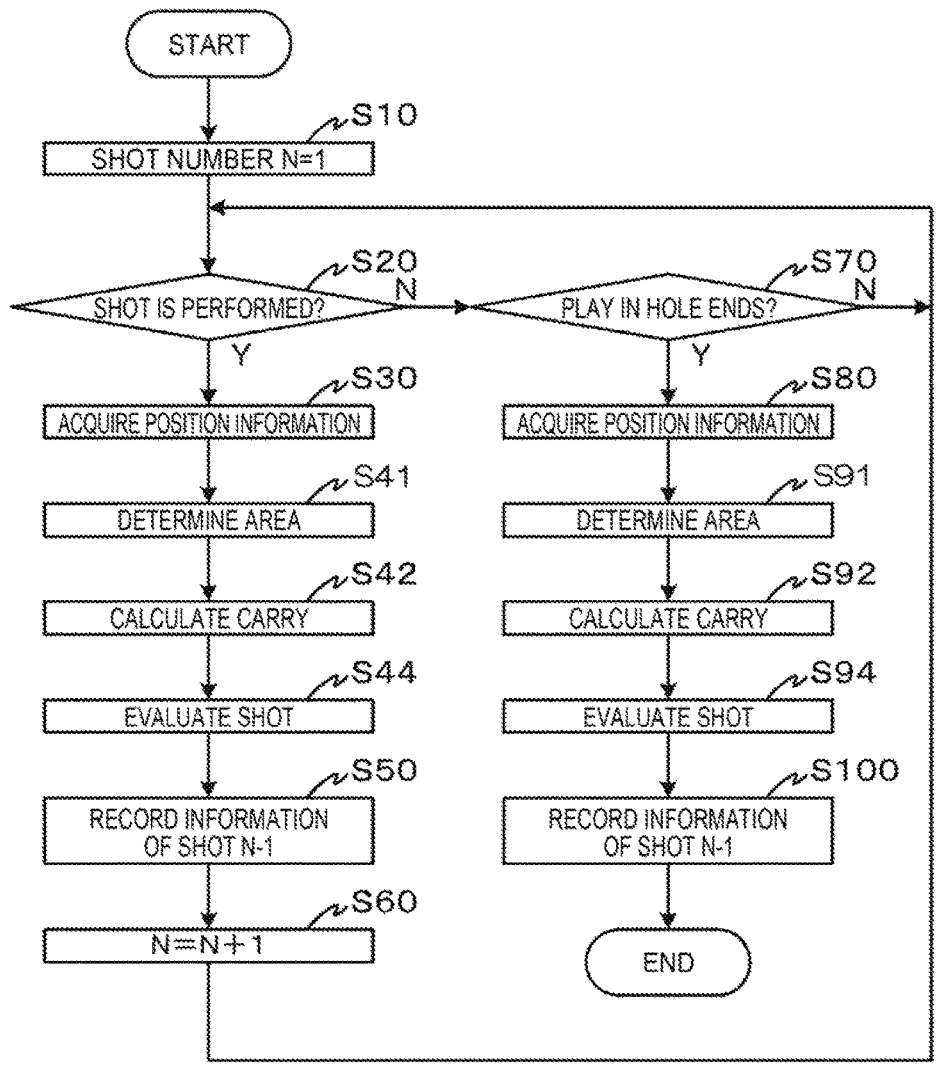
FIG. 18 is a flowchart for explaining an example of shot-information generation processing.

FIG. 18 is a flowchart for explaining an example of shot-information generation processing. Steps S10 to S41, steps S50 to S60, steps S70 to S91, and step S100 are the same as the steps in FIG. 14. Therefore, explanation of the steps is omitted.

After step S41, the carry measuring section 109 calculates a carry of the shot (step S42). Specifically, the carry measuring section 109 calculates a difference between the stop position 143 of the shot number N-2 included in the shot information 140 and the stop position (the stop position of the shot number N-1) acquired in step S30 to calculate a carry of the shot number N-1. Note that, when the shot number N is 2 or more, the carry measuring section 109 executes the processing in step S42.

The shot evaluating section 110 performs an evaluation of the shot (step S44). Specifically, as explained above, the shot evaluating section 110 evaluates the shot according to a predetermined rule on the basis of the carry calculated in step S42 and the hit ball area determined in step S41.

Note that, in step S50, the carry measuring section 109 sets, as the carry 144, the carry calculated in step S42 in a record (a record of the shot number N-1) added to the shot information 140. The shot evaluating section 110 sets, as the shot evaluation 147, the evaluation determined in step S44 in the added record.

After step S91, the carry measuring section 109 calculates a carry of the shot (step S92). Specifically, the carry measuring section 109 calculates a difference between the stop position 143 of the shot number N-2 included in the shot information 140 and the stop position (the stop position of the shot number N-1) acquired in step S80 to calculate a carry of the shot number N-1. Note that, when the shot number N is 2 or more, the carry measuring section 109 executes the processing in step S92.

The shot evaluating section 110 performs an evaluation of the shot (step S94). Specifically, as explained above, the shot evaluating section 110 evaluates the shot according to the predetermined rule on the basis of the carry calculated in step S92 and the hit ball area determined in step S91.

Note that, in step S100, the carry measuring section 109 sets, as the carry 144, the carry calculated in step S92 in the record (the record of the shot number N-1) added to the shot information 140. The shot evaluating section 110 sets, as the shot evaluation 147, the evaluation determined in step S94 in the added record.

Figure 19:
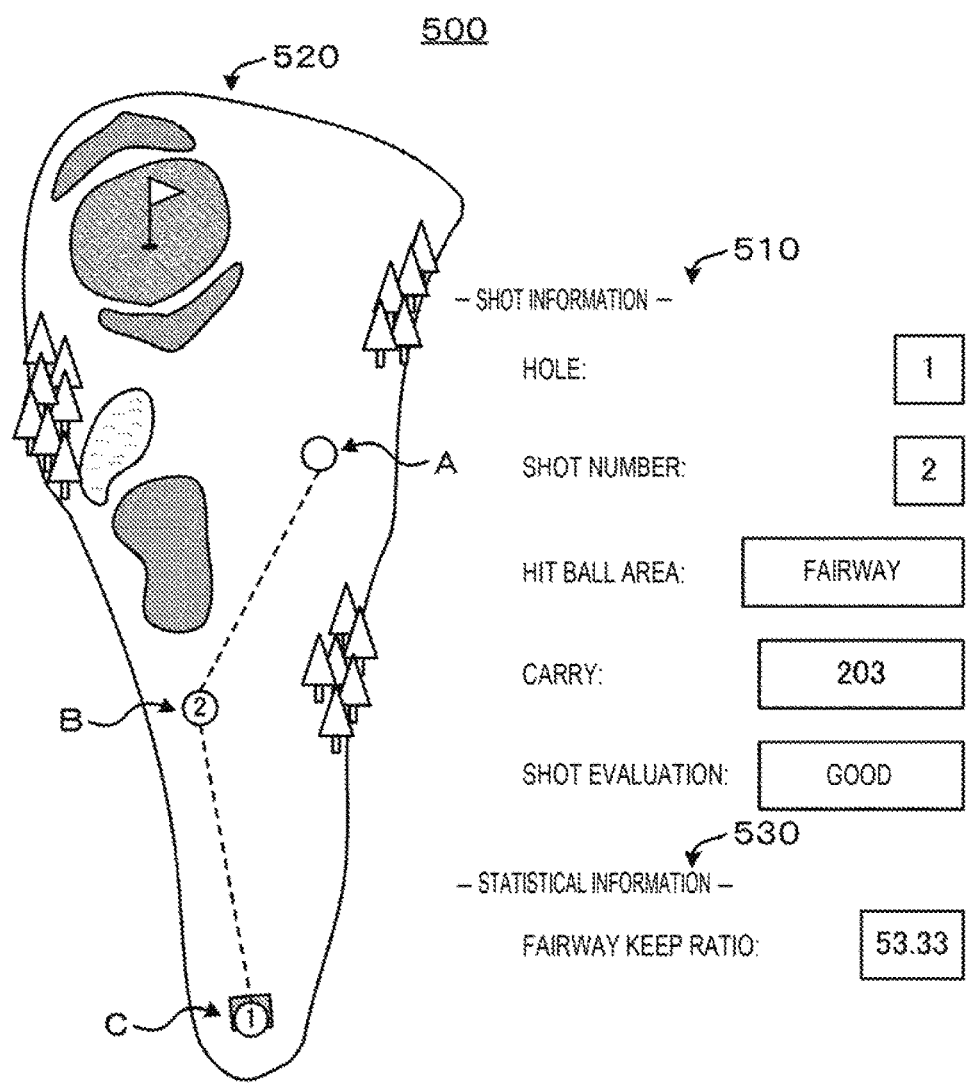
FIG. 19 is a diagram showing an example of a screen on which the shot information and statistical information are displayed.
Figure 20:
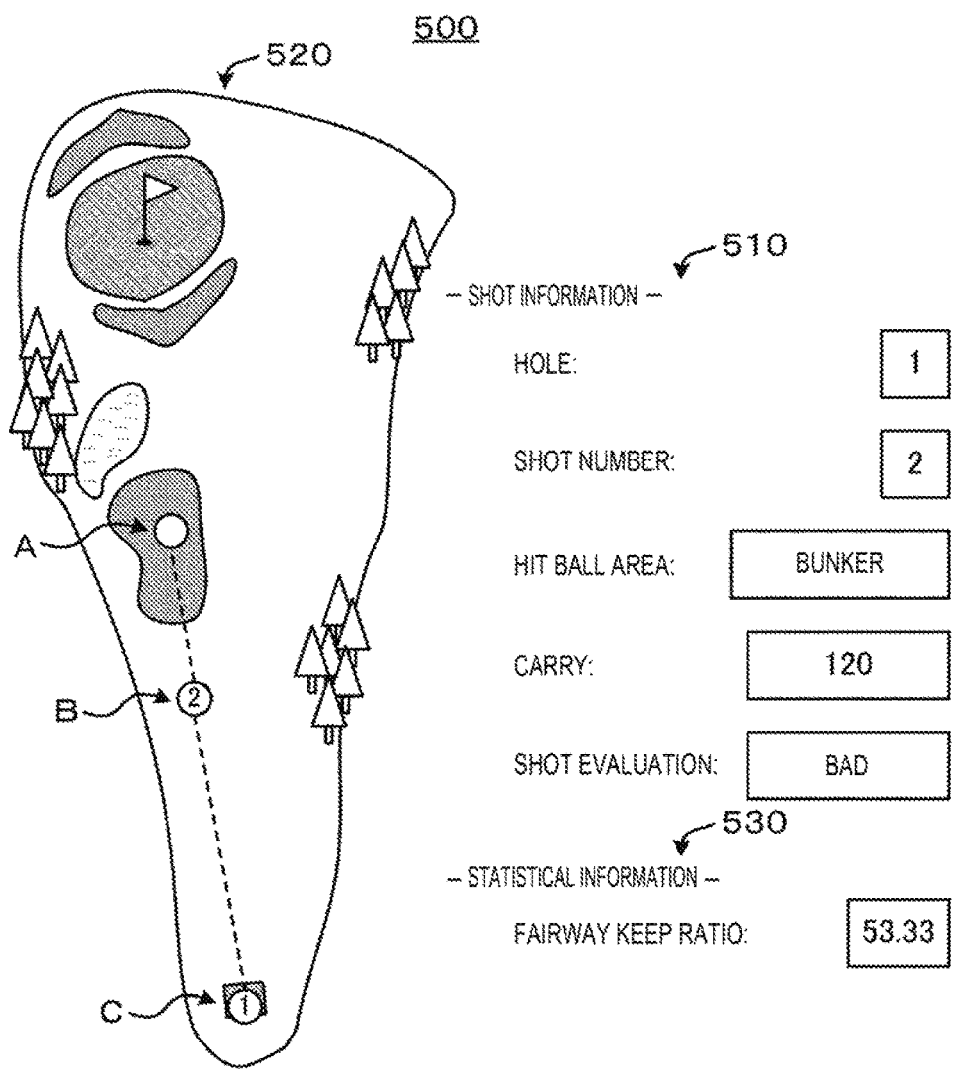
FIG. 20 is a diagram showing an example of a screen on which the shot information and the statistical information is displayed.

The output section 107 generates, according to operation by the user, the screen 500 shown in FIG. 19 (a diagram showing an example of a screen on which shot information and statistical information are displayed), FIG. 20 (a diagram showing another example of the screen on which shot information and statistical information are displayed), or the like, outputs the screen 500 to the display section 16, and causes the display section 16 to display the screen 500.

Unlike FIG. 15, in the shot information region 510, in addition to a hole number, a shot number in a hole indicated by the hole number, and a hit ball area of a hit ball by a shot indicated by the shot number, a carry of the shot and an evaluation of the shot are displayed. For example, the output section 107 acquires, from the shot information 140, a carry and a shot evaluation associated with the designated hole number and the designated shot number and displays the carry and the shot evaluation in the shot information region 510. In the example shown in FIG. 19, the stop position A of the ball of the shot number "2" is in a fairway and the shot evaluation is displayed as "good". In the example shown in FIG. 20, the stop position A of the ball of the shot number "2" is in the bunker and the shot evaluation is displayed as "bad".

The fourth embodiment of the invention is explained above. According to this embodiment, for example, the hit-ball determining device measures a carry of a shot on the basis of the distance between stop positions of a ball. Consequently, it is possible to easily and accurately calculate a carry. According to this embodiment, for example, the hit-ball determining device evaluates a shot on the basis of carries and stop positions of shots. Consequently, it is possible to easily and accurately evaluate the shot.

Modifications

The invention is not limited to the embodiments explained above and can be carried out in various forms without departing from the spirit of the invention. For example, in the embodiments, for example, modifications explained below may be added.

For example, in the second embodiment, the function of the carry measuring section 106 is not essential. In this case, the carry measuring device 2 may be referred to as hit-ball-direction measuring device.

In the embodiments, position information to be acquired can be information of two dimensions (latitude and longitude). However, the position information may be information of three dimensions (latitude, longitude, and altitude).

Specifically, for example, the position-information acquiring section 102 acquires position information of three dimensions from the GPS receiving section 11. For example, the position-information acquiring section 102 acquires, on the basis of position information of two dimensions acquired from the GPS receiving section 11 and map information including altitude information, the altitude of a position indicated by the position information. For example, a pneumatic altimeter is incorporated in or connected to the carry measuring device 2. The position-information acquiring section 102 acquires, on the basis of the position information of two dimensions acquired from the GPS receiving section 11 and an output signal of the pneumatic altimeter, the altitude of a position indicated by the position information.

The stop-position measuring section 105 sets position information of three dimensions in the stop position 143 of the shot information 140. The carry measuring section 106 calculates, as a carry of a hit ball, the distance between three-dimensional ball stop positions of continuous two shots and sets the carry in the carry 144 of the shot information 140. Consequently, for example, even when there is a slope in a golf course, it is possible to calculate a more accurate carry.

In the embodiments, the stop-position measuring section 105 may calculate ball stop positions of shots and a distance (a residual distance) to a predetermined target position (e.g., a position of a cup of a hole). In this case, the output section 107 may display, for example, in the shot information region 510, a residual distance corresponding to the designated hole number and the designated shot number. Consequently, it is possible to easily present an accurate residual distance as information useful for improvement of golf play of a player.

In the first and second embodiments, the control section 10 may include a shot evaluating section. The shot evaluating section evaluates, for example, on the basis of a carry of a shot, the shot according to a predetermined rule. For example, the shot evaluating section calculates an average carry of tee shots from the shot information 140 in the past. When a carry of an evaluation target tee shot exceeds the average carry, the shot evaluating section evaluates the shot as "nice shot". In this case, the output section 107 may display, for example, in the shot information region 510, an evaluation corresponding to the designated hole number and the designated shot number. Note that the output section 107 may display an index such as the average carry of the tee shot on the screen 500. Naturally, a method of evaluating a shot is not limited to the method explained above. For example, a shot may be evaluated on the basis of, for example, the size of a hit ball direction of the shot (a difference from a target direction). For example, a shot may be evaluated on the basis of a carry of the shot and the size of a hit ball direction of the shot.

In the embodiments, the plurality of sensors are included in one sensor device 3. However, the invention is not limited to this form. For example, it is also possible that a plurality of sensor devices are prepared, one or more sensors are mounted on the respective sensor devices, and the respective sensor devices are connected to the carry measuring device and the hit-ball determining device. In this case, the plurality of sensor devices can be attached to different positions, for example, attached to a golf club and a player.

In the embodiments, the sensor device 3 includes the three-axis acceleration sensor and the three-axis angular velocity sensor. However, the invention is not limited to this form. For example, the acceleration sensor may be a one-axis or two-axis acceleration sensor. The angular velocity sensor may be a one-axis or two-axis angular velocity senor. For example, the sensor device 3 does not have to include the acceleration sensor.

In the embodiments, the carry measuring device 2 or the hit-ball determining device 52 uses the GPS receiving section 11 incorporated therein. However, the invention is not limited to this form. For example, the carry measuring device 2 or the hit-ball determining device 52 may be connected to an external GPS receiver. Consequently, when the carry measuring device 2 or the hit-ball determining device 52 does not include a GPS receiving section, the carry measuring device 2 or the hit-ball determining device 52 can use the external GPS receiver. Even when the carry measuring device 2 or the hit-ball determining device 52 includes a GPS receiving section, the carry measuring device 2 or the hit-ball determining device 52 can use a GPS receiver having higher accuracy of position information. That is, the carry measuring system 1 and the hit-ball determining system 51 can be configured by the carry measuring device 2 or the hit-ball determining device 52, the sensor device 3, and the GPS receiving section incorporated in or externally attached to the carry measuring device 2 or the hit-ball determining device 52. The sensor device 3 may incorporate a GPS receiving section and output position information to the carry measuring device 2. For example, in the carry measuring device 2, the position-information acquiring section 102 may acquire present position information from a radio base station or a server on a network via the first communication section 12.

In the second embodiment, the carry measuring device 2 uses the sensor section 17 incorporated therein. However, the invention is not limited to this form. For example, the carry measuring device 2 may be connected to an external magnetic sensor and an external acceleration sensor. That is, the carry measuring system 1 can be configured by the carry measuring device 2, the sensor device 3, and the magnetic sensor and the acceleration sensor incorporated in or externally attached to the carry measuring device 2. The sensor device 3 may incorporate a magnetic sensor and output a signal to the carry measuring device 2.

In the embodiments, the carry measuring device 2 or the hit-ball determining device 52 stores shot information in the storage device such as the storing section 14. However, the invention is not limited to this form. For example, the output section 107 transmits shot information of holes for each golf course stored in the storage device to a server on a network via the first communication section 12 together with user information. The server stores, for example, by user, the shot information of the holes for each of golf courses. The server calculates, for example, on the basis of shot information of the users, indexes such as an average carry of tee shots, calculates a ranking or the like of the users for each of the indexes, and releases the ranking or the like on a WEB. The server may transmit generated comparison information to the hit-ball determining device 52. In the hit-ball determining device 52, the output section 107 may cause the display section 16 to display the received comparison information.

Note that the components of the carry measuring device 2 shown in FIGS. 2 and 6 or the components of the hit-ball determining device 52 shown in FIGS. 12 and 16 are classified according to main processing contents in order to facilitate understanding of the configurations of the carry measuring device 2 or the hit-ball determining device 52. The invention is not limited by a way of classification and names of the components. The components of the carry measuring device 2 or the hit-ball determining device 52 can also be classified into a larger number of components according to processing contents. The components of the carry measuring device 2 or the hit-ball determining device 52 can also be classified such that one component can execute a larger number of kinds of processing. Processing by the components may be executed by one kind of hardware or may be executed by a plurality of kinds of hardware. Sharing of the processing and the functions of the components is not limited to that explained above as long as the object of the invention can be achieved.

In the third and fourth embodiments, the function of the totalizing section is not essential. For example, in the fourth embodiment, the function of the shot evaluating section is not essential.

In the embodiments, the totalizing section 117 may record fairway keep ratios at points in time (e.g., every one month and every one year) in the storage device. In this case, the output section 107 may display the fairway keep ratios at the points in time (e.g., display the fairway keep ratios as a graph in time series). Concerning the other indexes such as the par-on ratio, the output section 107 may record values at the points in time and display the values.

In the third and fourth embodiments, the hit-ball determining device 52 stores the shot information in the storage device such as the storing section 14. However, the invention is not limited to this form. For example, the output section 107 transmits shot information of holes for each of golf courses stored in the storage device to a server on a network via the first communication section 12 together with user information. The server stores, for example, by user, the shot information of the holes for each of golf courses. The server calculates, for example, on the basis of shot information of the users, various indexes, generates comparison information such as a ranking of the users for each of the indexes, and releases the comparison information on a WEB. The server may transmit the generated comparison information to the hit-ball determining device 52. The output section 107 may cause the display section 16 to display the received comparison information.

The processing units of the flowcharts shown in FIGS. 4 and 9 or the processing units of the flowchart shown in FIGS. 14 and 18 are divided according to main processing contents in order to facilitate understanding of the processing by the carry measuring device 2 or the hit-ball determining device 52. The invention is not limited by a way of division and names of the processing units. The processing by the carry measuring device 2 can also be divided into a larger number of processing units according to processing contents. The processing can also be divided such that one processing unit includes a larger number of kinds of processing. Further, the processing order of the flowchart is not limited to the illustrated example.

The configurations of the shot information shown in FIGS. 3, 7, 13, and 17 are not limited to those shown in the figures. The configurations of the screens shown in FIGS. 5, 10, 15, 19, and 20 are not limited to those shown in the figures.

The entire disclosure of Japanese Patent Application No. 2014-257254, filed Dec. 19, 2014 and No. 2014-257252, filed Dec. 19, 2014 are expressly incorporated by reference herein.

What is claimed is:

1. A hit-ball-direction measuring device comprising:
   a first acquiring section configured to acquire a first sensor signal from a motion sensor attached to at least one of an exercise instrument and a user;
   a second acquiring section configured to acquire position information;
   a shot detecting section configured to detect a shot on the basis of the first sensor signal, wherein the second acquiring section acquires a second sensor signal from an orientation sensor attached to at least one of the exercise instrument and the user;
   a position measuring section configured to measure a shot position of a geographical location of the user at the time the shot is detected on the basis of the position information at time when the shot is detected; and
   a hit-ball-direction measuring section configured to measure a hit ball direction on the basis of the shot position of last time and the shot position of this time, wherein the hit ball direction measuring section measures a target direction of the shot on the basis of the second sensor signal and calculates a difference between the target direction and the hit ball direction.

2. A hit-ball determining device comprising:
   a first acquiring section configured to acquire a sensor signal from a motion sensor attached to at least one of an exercise instrument and a user;
   a second acquiring section configured to acquire position information;
   a third acquiring section configured to acquire map information including a plurality of areas;
   a shot detecting section configured to detect a shot on the basis of the sensor signal;
   a position measuring section configured to measure a shot position of a geographical location of the user at the time the shot is detected on the basis of the position information at time when the shot is detected, wherein the position measuring section measures, when N is an integer equal to or larger than 2, the shot position of an N-th shot as a stop position of a ball hit by an N−1-th shot;
   an area determining section configured to determine in which of the plurality of areas the shot position is included, wherein the area determining section determines in which of the plurality of areas the stop position of the ball of the N−1-th shot is included, and wherein the area determining section determines the stop positions of the ball of the shots for each of holes included in a golf course, and a totalizing section configured to calculate a par-on ratio on the basis of a number of holes in which the stop positions of the ball of the shots corresponding to a specified number of shots of par-on are included in greens.

3. The hit-ball determining device according to claim 2, wherein the shot detecting section detects the shot when an impact on the ball is detected.

4. The hit-ball determining device according to claim 2, wherein
the area determining section determines the stop positions of the ball of the shots for each of holes included in a golf course, and
the hit-ball determining device further comprises a totalizing section configured to calculate a fairway keep ratio on the basis of a number of holes in which the stop position of the ball of a first shot is included in a fairway.

5. The hit-ball determining device according to claim 2, further comprising a carry measuring section configured to measure carries of the shots on the basis of distances among the stop positions of the ball.

6. The hit-ball determining device according to claim 5, further comprising a shot evaluating section configured to evaluate the shots on the basis of at least one of the carries and the areas in which the stop positions of the ball are included.

7. The hit-ball determining device according to claim 6, wherein, when a carry of a shot exceeds a predetermined carry and the area in which the stop position of the ball of the shot is included is a fairway, the shot evaluating section evaluates the shot as a nice shot.

8. The hit-ball determining device according to claim 6, wherein, when a carry of a shot is smaller than the predetermined carry, the shot evaluating section evaluates the shot as a miss shot.

9. The hit-ball determining device according to claim 2, wherein the second acquiring section acquires position information from a GPS receiving section carried by the user.

10. The hit-ball determining device according to claim 2, wherein
the shot detecting section detects an end of a hole on the basis of the sensor signal or on the basis of a predetermined operation input, and
the position measuring section measures, as the stop position of the ball of a last shot in the hole, the position information at time when the end of the hole is detected, and
the area determining section determines in which of the plurality of areas the stop position of the ball of the last shot is included.

11. A hit-ball determining device comprising:
a first acquiring section configured to acquire a sensor signal from a motion sensor attached to at least one of an exercise instrument and a user;
a second acquiring section configured to acquire position information;
a third acquiring section configured to acquire map information including a plurality of areas;
a shot detecting section configured to detect a shot on the basis of the sensor signal;
a position measuring section configured to measure a shot position of a geographical location of the user at the time the shot is detected on the basis of the position information at time when the shot is detected; and an area determining section configured to determine in which of the plurality of areas the shot position is included,
wherein the second acquiring section acquires position information from a GPS receiving section carried by the user.

12. The hit-ball determining device according to claim 11, wherein the shot detecting section detects the shot when an impact on the ball is detected.

13. The hit-ball determining device according to claim 11, wherein
the area determining section determines the stop positions of the ball of the shots for each of holes included in a golf course, and
the hit-ball determining device further comprises a totalizing section configured to calculate a fairway keep ratio on the basis of a number of holes in which the stop position of the ball of a first shot is included in a fairway.

14. The hit-ball determining device according to claim 11, further comprising a carry measuring section configured to measure carries of the shots on the basis of distances among the stop positions of the ball.

15. The hit-ball determining device according to claim 14, further comprising a shot evaluating section configured to evaluate the shots on the basis of at least one of the carries and the areas in which the stop positions of the ball are included.

16. The hit-ball determining device according to claim 15, wherein, when a carry of a shot exceeds a predetermined carry and the area in which the stop position of the ball of the shot is included is a fairway, the shot evaluating section evaluates the shot as a nice shot.

17. The hit-ball determining device according to claim 15, wherein, when a carry of a shot is smaller than the predetermined carry, the shot evaluating section evaluates the shot as a miss shot.

18. The hit-ball determining device according to claim 11, wherein
the shot detecting section detects an end of a hole on the basis of the sensor signal or on the basis of a predetermined operation input, and
the position measuring section measures, as the stop position of the ball of a last shot in the hole, the position information at time when the end of the hole is detected, and
the area determining section determines in which of the plurality of areas the stop position of the ball of the last shot is included.

19. A hit-ball determining device comprising:
a first acquiring section configured to acquire a sensor signal from a motion sensor attached to at least one of an exercise instrument and a user;
a second acquiring section configured to acquire position information;
a third acquiring section configured to acquire map information including a plurality of areas;
a shot detecting section configured to detect a shot on the basis of the sensor signal;
a position measuring section configured to measure a shot position of a geographical location of the user at the time the shot is detected on the basis of the position information at time when the shot is detected, wherein the position measuring section measures, when N is an integer equal to or larger than 2, the shot position of an N-th shot as a stop position of a ball hit by an N−1-th shot;

an area determining section configured to determine in which of the plurality of areas the shot position is included, wherein the area determining section determines in which of the plurality of areas the stop position of the ball of the N−1-th shot is included; and a carry measuring section configured to measure carries of the shots on the basis of distances among the stop positions of the ball.

20. The hit-ball determining device according to claim 19, further comprising a shot evaluating section configured to evaluate the shots on the basis of at least one of the carries and the areas in which the stop positions of the ball are included.

21. The hit-ball determining device according to claim 20, wherein, when a carry of a shot exceeds a predetermined carry and the area in which the stop position of the ball of the shot is included is a fairway, the shot evaluating section evaluates the shot as a nice shot.

22. The hit-ball determining device according to claim 20, wherein, when a carry of a shot is smaller than the predetermined carry, the shot evaluating section evaluates the shot as a miss shot.

* * * * *